Aug. 30, 1966  E. FUCHS ETAL  3,269,286
COPY JUSTIFICATION APPARATUS
Filed Nov. 3, 1964  8 Sheets-Sheet 6
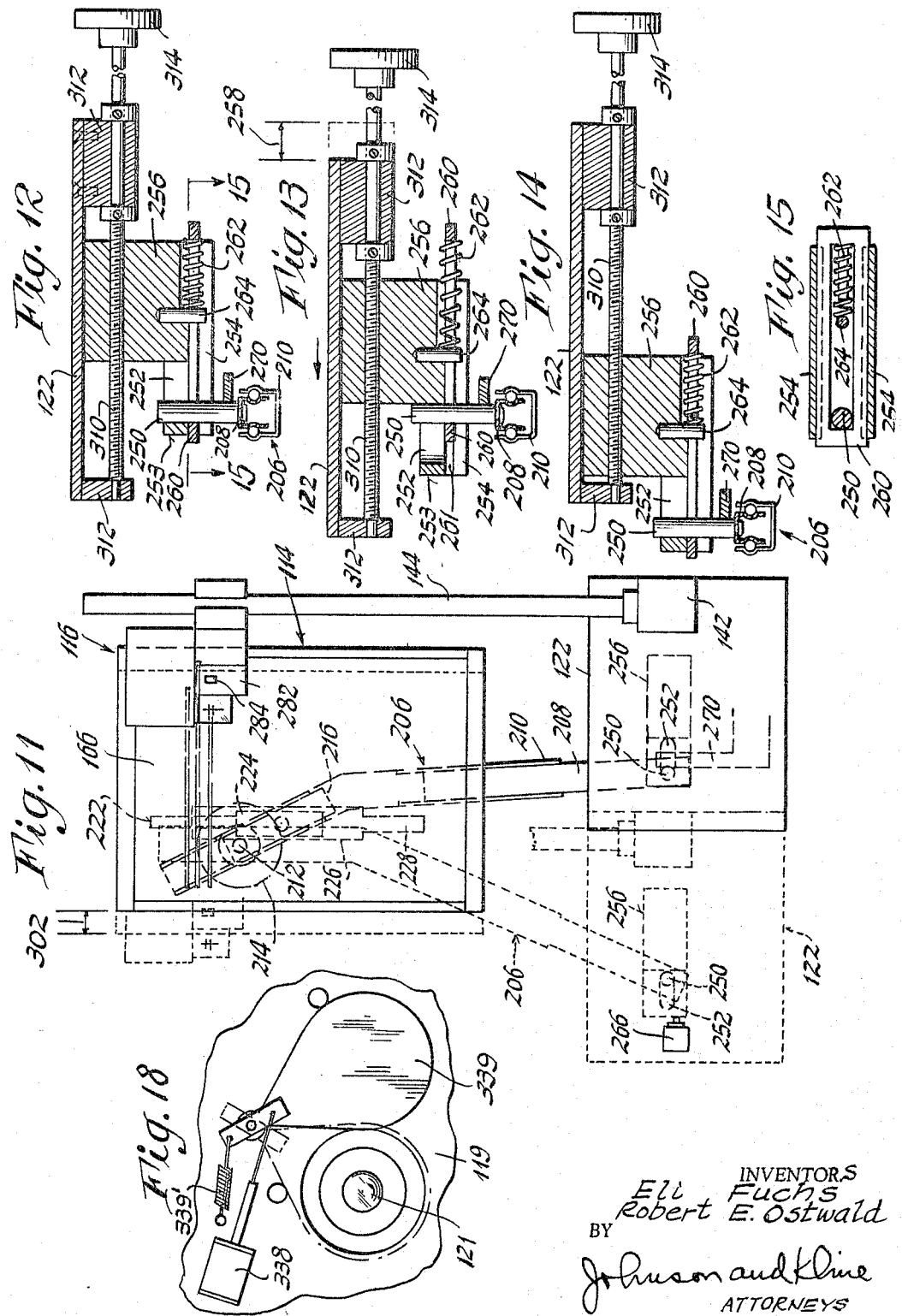
INVENTORS
Eli Fuchs
Robert E. Ostwald
BY
Johnson and Kline
ATTORNEYS

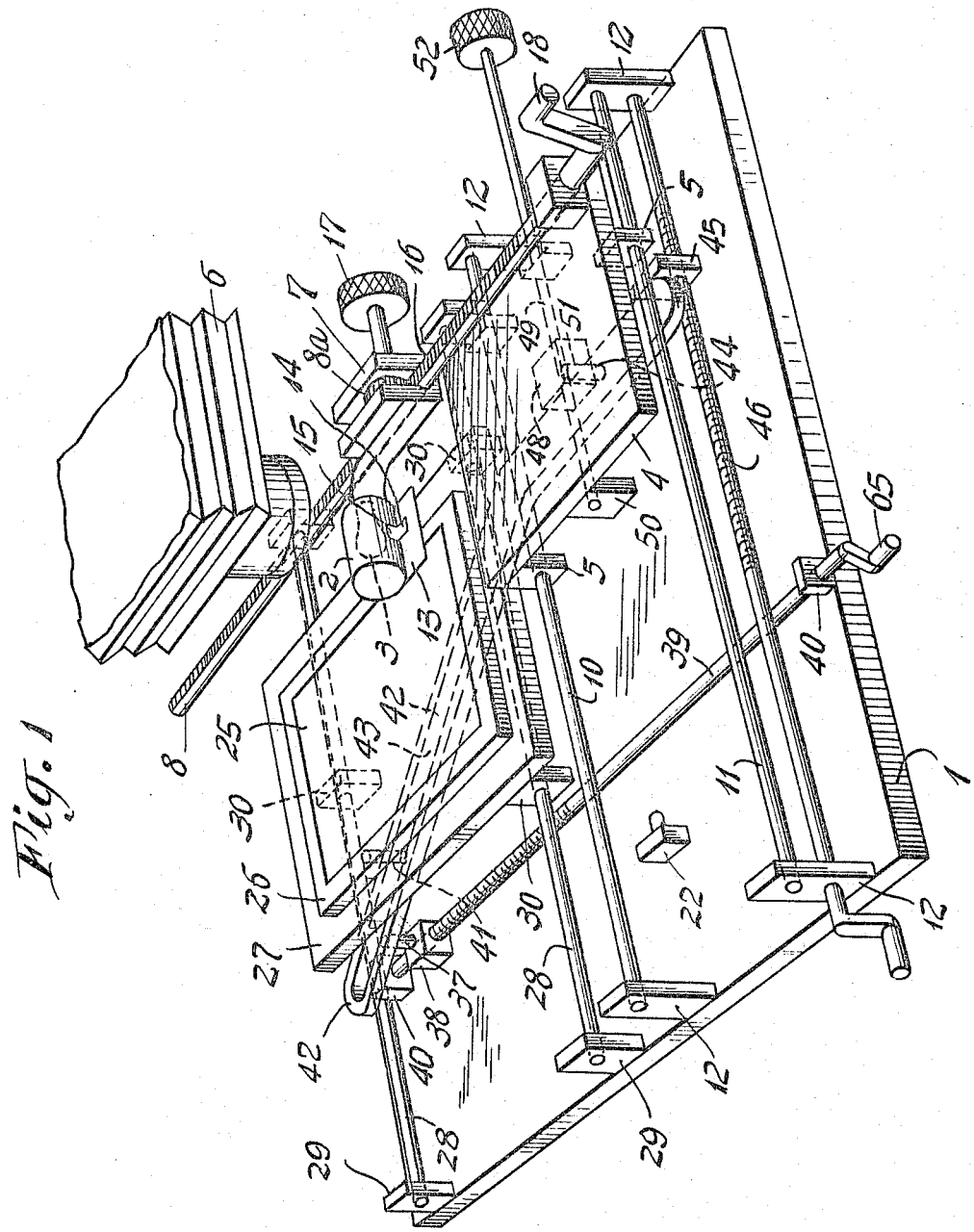

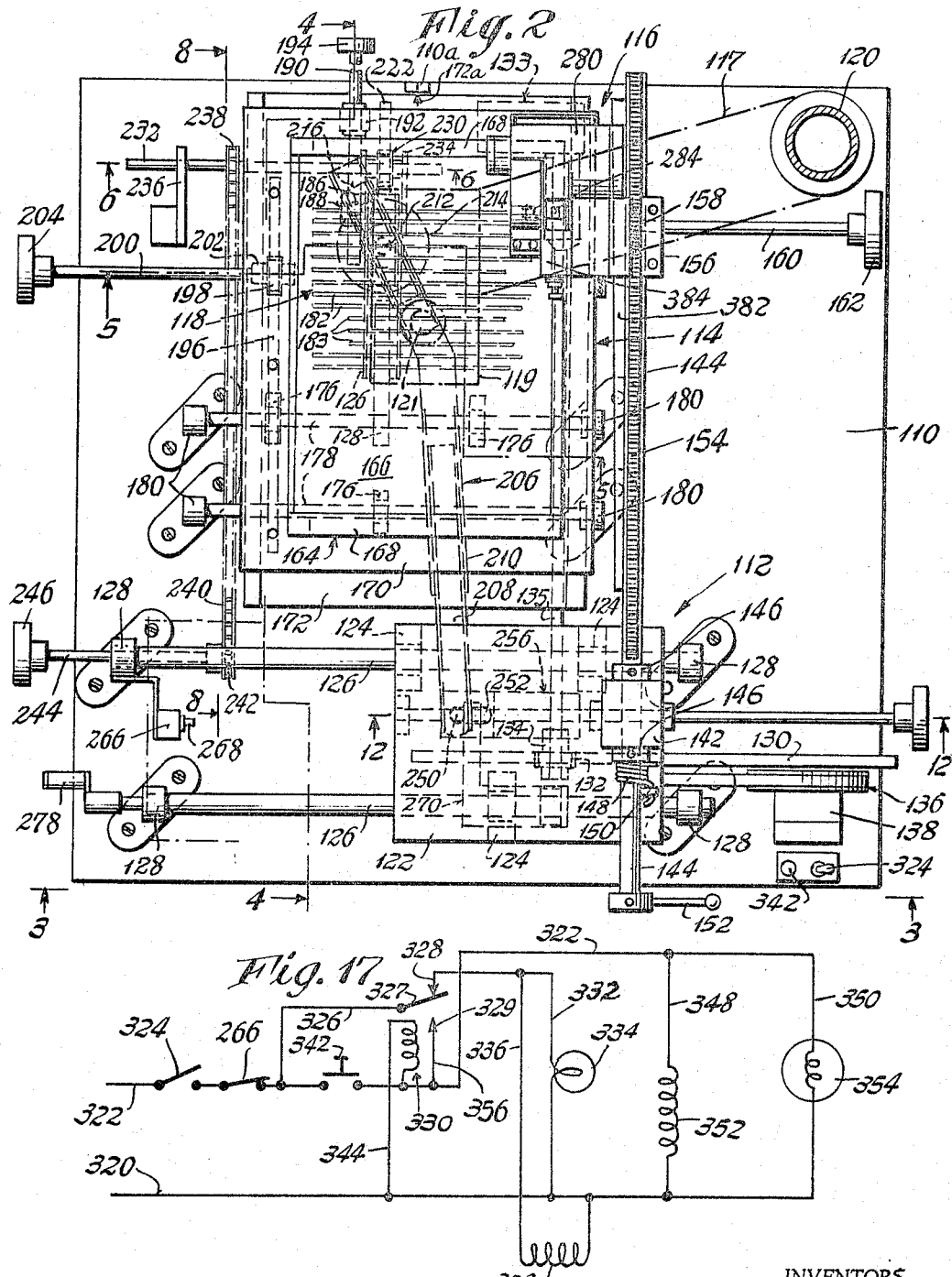

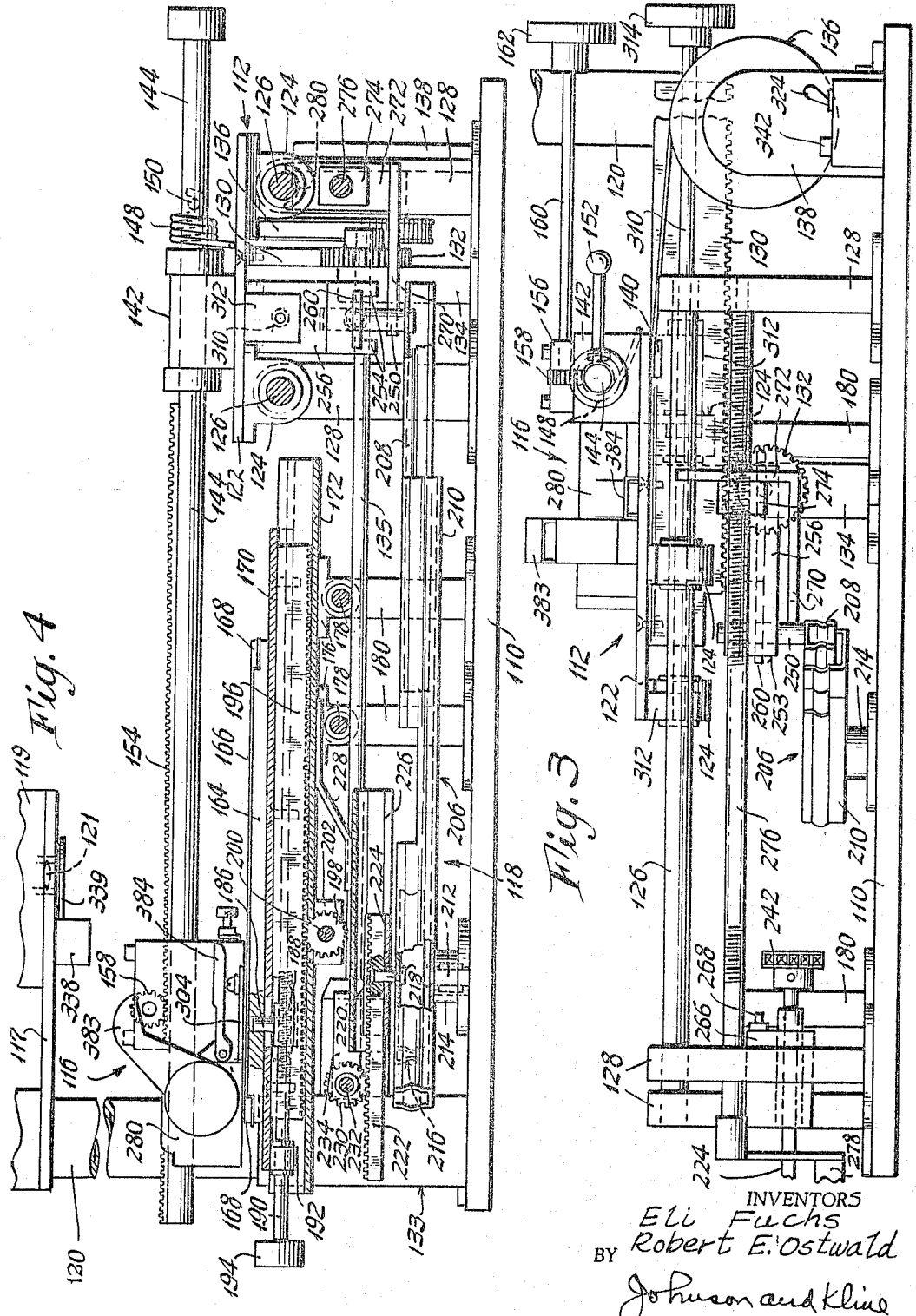

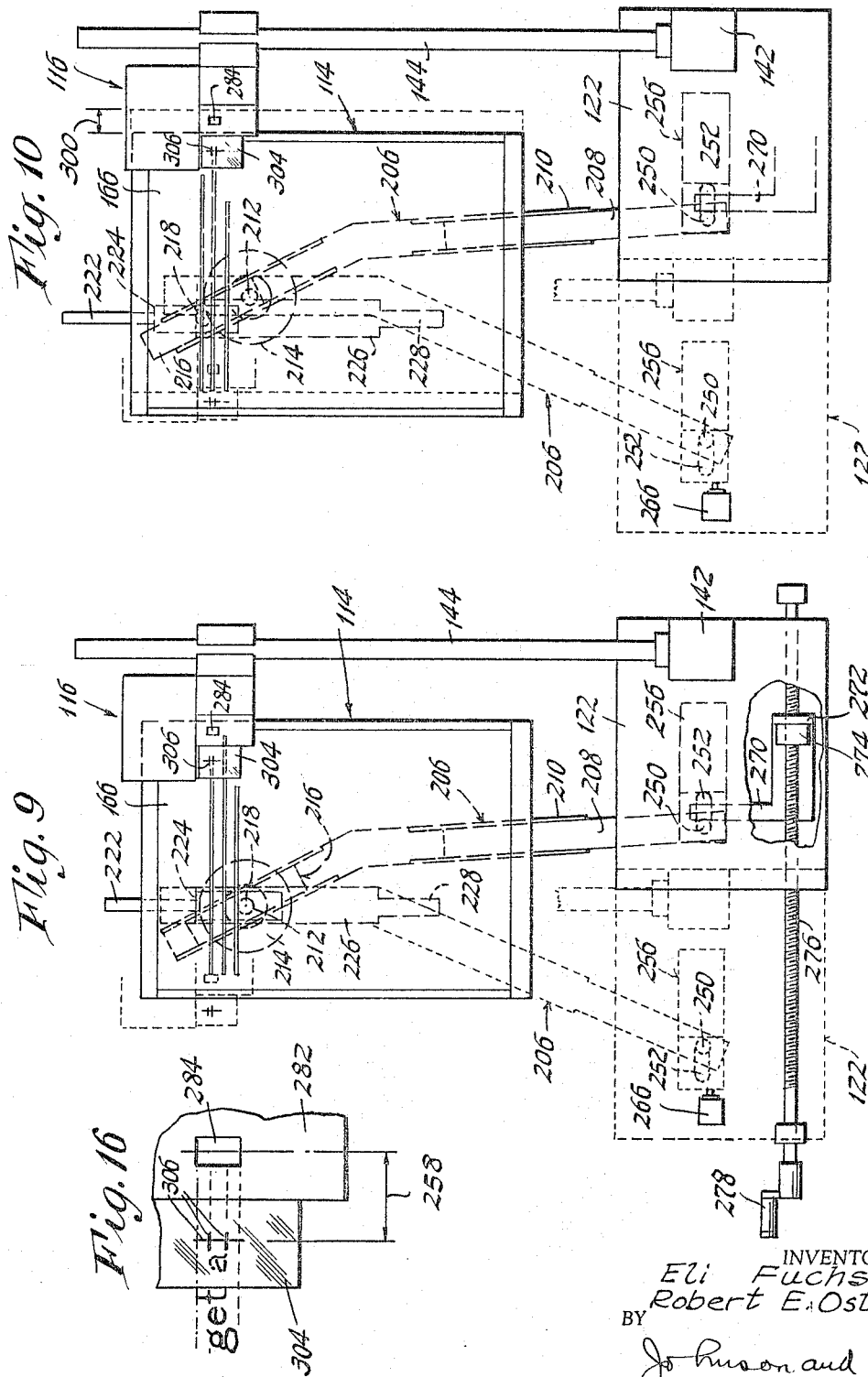

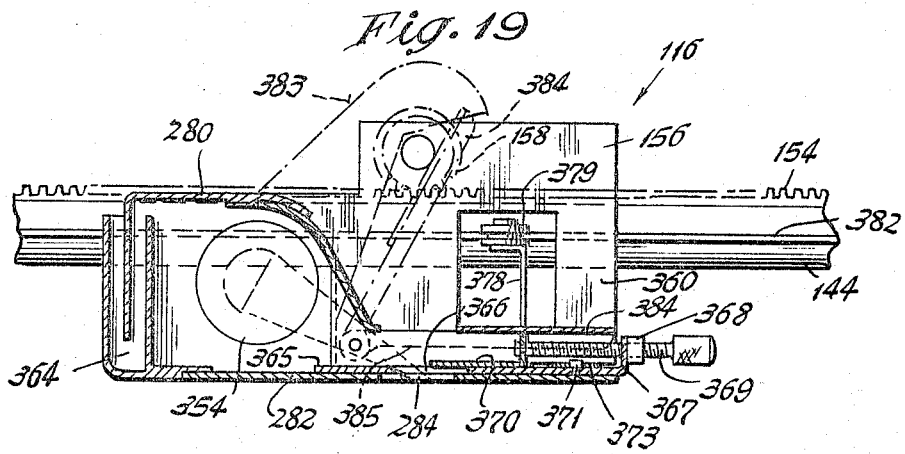
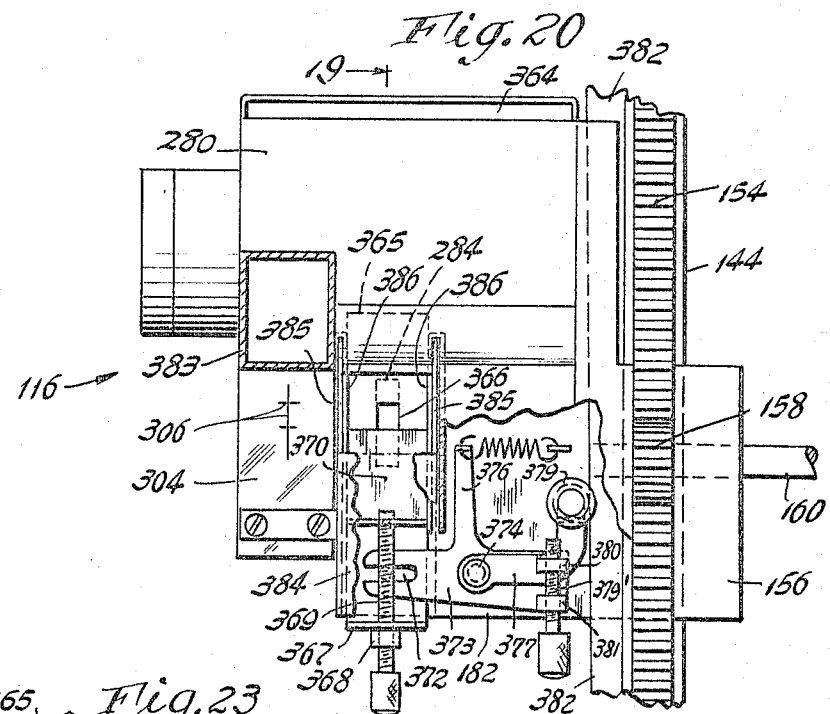
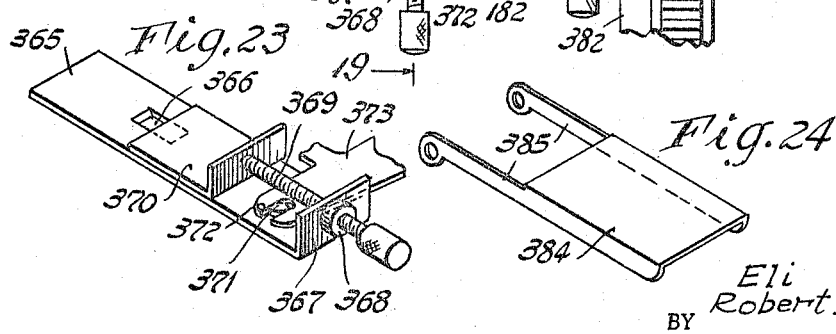

Aug. 30, 1966  E. FUCHS ETAL  3,269,286
COPY JUSTIFICATION APPARATUS
Filed Nov. 3, 1964  8 Sheets-Sheet 8

INVENTORS
Eli Fuchs
Robert E. Ostwald
BY Johnson and Kline
ATTORNEYS

United States Patent Office 3,269,286
Patented August 30, 1966

3,269,286
COPY JUSTIFICATION APPARATUS
Eli Fuchs, Rockwell Apt. 3, R.F.D. 4, Chambersburg, Pa., and Robert E. Ostwald, 479 Carlton Blvd., Staten Island, N.Y.
Filed Nov. 3, 1964, Ser. No. 408,608
18 Claims. (Cl. 95—4.5)

This invention relates to the graphic arts, and more particularly to reproducing by photographing, photolithography, or other appropriate means, printed matter such as books, pamphlets and the like.

This application is a continuation-in-part of our copending application, Serial No. 200,283, filed June 5, 1962, now abandoned.

An object of this invention is to produce by photographic means a negative or other reproduction suitable for use in making copies by printing or lithography, etc. in which the right-hand ends of the lines of the reproduction are aligned vertically, i.e. justified, from a copy in which the right-hand ends of the lines, typewritten lines for instance, are not aligned.

Although several methods and apparatus for justifying typewritten copy have been developed, these have not found wide acceptance due either to the need for double typing, and/or the complicated procedure required to be performed, and/or the excessive complexity and consequently the prohibitive cost of the equipment, all of which drawbacks the present invention overcomes.

In addition, the prior art apparatus, while achieving line justification either imperfectly or through various complicated or expensive apparatus, cannot perform auxiliary operations such as providing for the indention of the left-hand margin, accurate control of the left-hand margin, or convenient line selection or skipping, all of which are provided for by the present invention.

It is an object of the invention, therefore, to provide improved methods and apparatus for line justification which is convenient to use, simple and relatively inexpensive, requires a minimum number of operations, and is adapted for performing a wide variety of auxiliary operations.

Briefly stated, the apparatus embodying the present invention as illustrated herein includes a copy carrier which is horizontally adjustable angularly, laterally and longitudinally with respect to a scanning means adapted to scan each line of a piece of copy in producing the justified reproduction one line at a time. Means are also provided for setting the scanning means at the optimum right-hand margin position of each line to be photographed as required prior to operation of the scanning means. Drive means, either manual or semi-automatic, are provided for moving both the scanning means and the copy carrier during the scanning operation, the relationship being such that the scanning means always traverses the same distance from the optimum line to the left-hand margin of the line whether it is scanning a short line of the copy or a long line of the copy, or a line of optimum length.

This is accomplished by variably coupling the copy carrier and a carriage on which the scanning means are mounted so that the copy carrier remains stationary if the line to be copied has the optimum length or moves to the right if the line to be copied is longer than the optimum line, and moves to the left if the line to be copied is shorter than the optimum line, with the result that the characters and spaces on the reproduction of the longer line are of decreased width, of the shorter line are of increased width, and the lines on the reproduction are justified.

If it is desired to copy text which is indented from the left-hand margin of the copy and still have the right-hand lines justified on the reproduction, it is merely necessary to readjust the carriage and its right-hand stop for the scanning means to the indented left-hand margin.

If it is desired to omit particular lines on the copy, it is merely necessary to adjust the copy holder on the copy carrier from a position in which the last line written aligns with the aperture of the scanning means to a position in which the next line to be written is positioned under the aperture of the scanning means.

Having thus briefly described the invention, it becomes a principal object thereof to provide an apparatus for producing justified print in the forms of negatives, positives, offset masters, and electro-static images, from unjustified typewritten and similar originals without change in the height of the characters and without any undesirable distortion.

It is another object of this invention to provide apparatus for producing reproductions of printed matter having curved or irregular right- and/or left-hand margins in accordance with a prescribed pattern or layout, as may be required to fit an advertising layout or to fit copy in relation with an adjacent illustration.

Another object of this invention is to provide an apparatus which achieves the foregoing objects by using any standard graphic arts camera, the entire corrective means being accomplished in a novel copy holding and line justifying device.

It is still another object of the present invention to provide an apparatus which justifies lines to an even right-hand position that differ in length, not only with regard to the right margin but also with regard to the left margin, such as indented lines or paragraphs, and which justifies narrow columns of copy with the left margin at any position on the copy sheet.

It is another object of the present invention to provide an apparatus having means for by-passing lines of copy such as those including an error, or for inserting additional lines out of sequence such as transposition from one place on the copy sheet to another place on the reproduction, and then resume the continuity of the copy.

It is still another object of the present invention to provide an apparatus having a novel linkage which makes it possible to effect line justification adjustments with the scanning means displaced from the last character of the line so that this character is plainly visible and not obscured by the scanning means.

It is still another object of the present invention to provide an apparatus having means for pivotally adjusting the copy sheet to align the lines of copy relative to the path of travel of the scanning means after the copy sheet has been inserted on the apparatus.

It is yet another object of the present invention to provide an apparatus having means for varying the exposure angle of a predetermined area on the copy sheet relative to the camera optical system as the scanning means progresses from line to line down the copy sheet.

It is a still further object of the present invention to provide apparatus in which the scanning means is operated in a semi-automatic manner by suitable power means including position-responsive elements for actuating other components of the apparatus.

It is still another object of the present invention to provide an apparatus having means for justifying a succession of lines by extending or condensing the major portion of each line, leaving a portion of the line on the reproduction unchanged from the original.

It is a still further object of the present invention to provide an apparatus in which the justification of only a major portion of a line mentioned in the preceding object occurs over the length of an indented line, with the portion of a full line remaining unchanged being equal in length to the amount of indentation of an indented line whereby the apparatus is capable of justifying both full lines and indented without the necessity for any intervening adjustments thereto.

These and other objects of the present invention will become more readily apparent from a consideration of the following detailed description of the several embodiments of the invention when considered in conjunction with the accompanying drawings in which:

FIGURE 1 is a view in perspective of one modification of the apparatus embodying some of the principles of this invention.

FIGURE 2 is a plan view of another more refined modification of the apparatus embodying the principles of this invention.

FIGURE 3 is an enlarged front elevation taken on the line 3—3 of FIGURE 2.

FIGURE 4 is an enlarged side sectional view taken on the line 4—4 of FIGURE 2.

FIGURE 9 is a diagrammatic plan view of a portion of the apparatus illustrated in FIGURE 2 and showing the relative positions of the movable components when the apparatus is adjusted for duplicating a copy line of optimum length.

FIGURE 10 is a view similar to FIGURE 9 with the apparatus adjusted to duplicate a copy line longer than optimum length.

FIGURE 11 is a view similar to FIGURE 9 with the apparatus adjusted for duplicating a copy line shorter than optimum length.

FIGURE 12 is an enlarged sectional view taken on the line 12—12 of FIGURE 2 illustrating the overtravel and left margin indentation adjustment mechanisms.

FIGURE 13 is a view similar to FIGURE 12 showing the overtravel mechanism in position to commence a scanning cycle.

FIGURE 14 is a view similar to FIGURE 13 illustrating the left margin indentation adjustment mechanism in a position for scanning a left margin indentation.

FIGURE 15 is a top sectional view taken on the line 15—15 of FIGURE 12.

FIGURE 16 is an enlarged schematic view illustrating the principle of overtravel.

FIGURE 17 is a wiring diagram of the circuitry employed for achieving semi-automatic operation of the apparatus of this invention.

FIGURE 18 is a bottom view of the camera optical system shutter mechanism which is operated by the apparatus of this invention.

FIGURE 19 is a side sectional view taken on the line 19—19 of FIGURE 20.

FIGURE 20 is an enlarged fragmentary plan view of the scanner unit of FIGURE 2 illustrating certain details thereof.

FIGURE 23 is a fragmentary perspective view of the adjustable aperture shutter mechanism.

FIGURE 24 is a perspective view of the mirror support frame.

Figure 5:
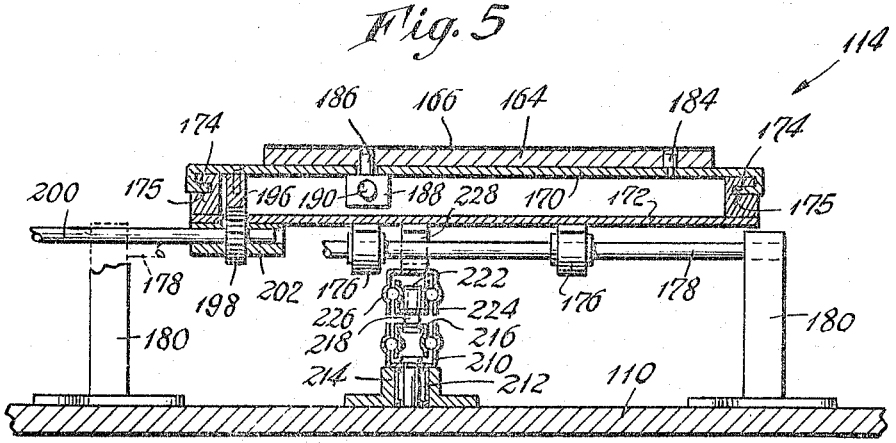
FIGURE 5 is an enlarged fragmentary sectional view taken on the line 5—5 of FIGURE 2.

The apparatus of the invention shown in FIG. 1 includes a horizontal base 1 having a top surface on which are secured at least two sets of supports 29 in which a pair of guide rods 28 are fixed to be parallel to each other and to the top surface of the base 1. At least three bearing blocks 30 are slidably mounted on the rods 28 with one on one rod and two on the other and a copy carrier 27 in the form of a table is fixed to the bearing blocks 30 so that it is horizontally slidable on the rods 28 transversely of the base 1.

A copy holder 26 in the form of a plate or the like is adapted to carry the copy sheet 25 and is positioned on the copy carrier 27 so as to be movable in line-space direction thereon to bring a desired line on the copy into copying position either initially or at any time that it is desired to skip one or more lines in making the reproduction. For this purpose, the copy holder 26 may be provided with suitable guide tracks (not shown) extending perpendicularly to the lines on the copy and it may be driven with respect to the carrier 27 by a rack and pinion or the like.

The base 1 also carries a pair of horizontal parallel rods 10 and 11 secured near the front of the base in supports 12 and these rods support for transverse movement a scanner carriage 4 in the form of a plate which is slidably mounted on the rods 10 and 11 by means of bearings 5 secured to the under-surface of the plate. The under-surface of the carriage 4 carries a screw-threaded rod 49 rotatably supported in bearings 50 secured to the carriage. An internally threaded block 48 is threaded on the screw rod 49 and has a hole 51 which rotatably receives a pin 44 on a compensating bar 42. An adjustable stop 45 for controlling the right-hand limit of travel of the carriage 4 and the associated scanning means rides on a screw 46 which is rotatably supported on the base 1 by means of supports 12. The stop 45 is adapted to engage the compensating bar 42 which controls the movement of the copy carrier 27.

The base 1 also carries at opposite ends thereof an aligned pair of bearings 40 in which a screw 39 is rotatably mounted. The rod 39 carries an operating handle 65. A block 38 is threaded on the screw and carries an upwardly extending pin 37. The carriage 27 carries on its lower surface a similar but downwardly extending pin 41. The compensating bar 42 for the carrier 27 which constitutes a coupling member between the carrier 27 and the carriage 4 is positioned between the carrier 27 and the base 1 and has a slot 43 in which the pins 37 and 41 ride. The pins 37 and 41 are spaced apart vertically sufficiently to be positioned in axial alignment with each other in the slot 43. At the other end, the bar 42 carries the pin 44 which with the threaded block 48 constitutes the driving means for moving the bar angularly.

On the top surface of the carriage 4 there is secured a bearing 9 in which a rod 8 is rockably mounted to extend rearwardly parallel to the base 1 and the copy holder 26. A scanner support 7 is movably mounted on the rod 8 and includes a pinion 8a shown which meshes with a tooth rack 16 formed on the rod 8. The scanner support 7 is connected to a scanner housing 2 which carries a suitable light source 3 positioned to permit light to pass through an aperture 15 in the housing and then through an aperture 14 in a mask 13 onto the copy 25 located beneath the mask.

The handle 18 on the rod 8 is for rocking the rod 8, the scanner support 7, the scanner housing 2 and the mask 13 in order to move the scanner housing and mask out of the way to permit insertion of the copy holder 26 beneath them. The scanning means of the present invention which includes the lamp housing 2, the lamp 3 and the apertured mask 13, may be moved in line-spacing direction by rotating the pinion 8a engaging the rack 16 by means of the knob 17.

The apparatus of the present invention includes a photographic camera 6 suitably supported in position over the copy holder 26 and has a lens system adapted to include in its field the entire surface of the copy 25 supported on the copy carrier 27 and having its stationary film or other photo-responsive sheet or plate exposed to the copy 25 as the scanning means passes over the copy from one end of a line to the other and from line to line.

In initially setting up the apparatus of this invention, the sheet of copy 25, the lines of which are to be justified in the reproduction, is secured to the copy holder 26 by any suitable means such as spring clamps or the like (not shown) and the copy holder 26 is placed on the carrier 27 so that the lines on the copy are parallel with the guide rods 28. To provide alignment of the left-hand margin of the reproduction, the carriage 4 is moved to the left until the elongated slot 43 in the bar 42 is vertically aligned with the screw 39.

Then the screw 49, by operation of the knob 52, is rotated to move the scanner aperture 14 in the mask 13 into alignment with the left-hand margin of the lines of the copy. This movement of the scanner carriage does not disturb the vertical alignment of the slot 43 with the screw 39 but merely moves the carriage 4 and its scanning means, since the rotation of the screw 49 moves the carriage 4 relative to the block 48 and pin 44.

Then the screw 39 is rotated by its crank 65 to bring the pin 37 on the block 38 into axial alignment with the pin 41 of the copy carrier 27 in which situation the scanning carriage 4 may be moved either to the right or to the left and in doing so swing the compensating bar 42 without moving the copy carrier 27. Next the stop 45 carried by the screw 46 is adjusted by rotation of the screw to control the right-hand limit of movement of travel of the scanning carriage 4 and thus control the length of the optimum line. When the scanner carriage 4 is moved to the right and the stop 45 is engaged by the projecting end of the bar 42, the aperture 14 in the mask 13 is located at the position which determines the right-hand margin to be maintained on the photographic reproduction of the copy. This margin is most conveniently selected about midway between the shortest and longest lines of the copy to be justified.

This movement of the carriage 4 to the right-hand limit of travel thereof causes the bar 42 through pin 44 to rotate about the axial aligned pins 37 and 41 as a center to some position of rotation from vertical alignment with the screw 39. However, since pins 37 and 41 are axially aligned, the copy carrier 27 remains stationary while the carriage 4 is thus being moved.

If the line to be copied is of the optimum length, no further adjustments need be made, and it is merely necessary to open the shutter on the camera 6 and energize the lamp 3 and move the scanning carriage 4 to the left so that the line will be photographed. During this movement the copy carrier 27 will remain stationary since the vertical alignment of the pins 37 and 41 has not been disturbed, for swinging movement of the bar 42 will be about the axes of the pins 41 and 37.

To start photographing, the copy carriage 4 is adjusted to bring the right-hand end of the first line of the copy 25 into position in the aperture 14 in the mask 13. Of course, the first line may be longer or shorter than the optimum line.

Assuming that the first line in the copy is longer than the optimum line, screw 39 is rotated by its handle 65 to move pin 37 forward toward the front of the base, and this movement of pin 37 causes bar 42 engaged thereby to rotate counterclockwise around pin 44 on the carrier 27. This rotation of bar 42 acting through pin 41 causes the copy carrier 27 to move to the left, and this movement is continued until the right-hand end of the first line is properly positioned in the aperture 14. This movement of the bar 42 places the pin 37 to the right and forward of the pin 41.

Next, the scanning lamp 3 is turned on and the lens of camera 6 is opened, and scanning carriage 4 is moved to the left on the rods 10 and 11. The carriage travels to the left until pins 37 and 41 are aligned with the axis of screw 39. At this time, bar 42 strikes the limit switch 22 which may be connected to turn off the scanning lamp and any other automatic apparatus which may be provided. Actually, since the left-hand margin of the copy itself is usually accurate and even, the scanner completes its scanning operation at the left-hand end of the line, and it is of no consequence if it actually travels beyond this point. After a line has been scanned, the carriage 4 is moved to the right-hand limit of its travel for the next scanning operation.

Considering again the first line scanning operation, it can be seen that, as the scanner carriage 4 moves to the left, through its connection to pin 44, it carries bar 42 with it and causes the bar to rotate clockwise around the adjustable, but then fixed pin 37. This clockwise movement of bar 42 carries pin 41 with it and causes copy carrier 27 and copy holder 26 to move to the right. Thus, as the copy moves to the right, while the scanning means moves to the left and when the left-hand margin of the copy is reached, the slot 43 in the bar 42 is vertically over screw 39 and the pins 37 and 41 are in alignment with each other along a line parallel to the axis of the screw 39. It can be seen that the scanner carriage 4 and scanner 2 traverse a fixed distance in scanning a line of copy. Thus, in order to completely scan a line, which is longer than the optimum line, the carriage 27 moves in a direction opposite to that of the scanner carriage 4 and at a rate depending on the difference in length of the line being scanned and the optimum line and thus accelerates the passage of the first line of copy under the scanner aperture 14. This condenses the line of copy to the optimum length.

To scan the second line of the copy, the scanning lamp housing 2 is moved downwardly by means of pinion operating knob 17 to bring the aperture 14 in the mask 13 into alignment with the second line. Next, the extent of travel of the carrier 27 must be horizontally adjusted to compensate for the length of the second line. Assuming that the second line is shorter than the optimum line, the screw 39 is operated to move pin 37 toward the rear of the base 1, and this causes the bar 42 to rotate clockwise about pin 44 and move carriage 27 and the copy to the right until the right-hand end of the second line is properly positioned under the aperture 14. With this arrangement of the parts, the pin 37 lies above and to the left of pin 41. As this scanning operation on the second line takes place, the scanner carriage 4 and scanner 2 moves to the left and the carriage 27 carrying the copy also moves, to the left. This, in effect, stretches the line to the length of the optimum line and causes the whole line to be scanned during the fixed amount of travel of the scanner.

The operations above described proceed line-by-line until the copy has been completely photographed, after which the sheet of film or other photographic medium is removed from the camera in the usual way and is used to make a planographic, stereotype or other printing plate to produce copies with the lines justified.

It will be understood by those skilled in the art that the film or other sensitive medium used may have an exposure index which will result in no exposure falling on the copy even though the entire sheet of film is exposed to ambient light when the shutter is open, but only when exposed to intense light from the lamp 3 falling on the small sections of the copy exposed through the aperture 14.

The apparatus may also be adjusted to provide left-hand indention of the text. Assuming that the indention is to be, say one inch, the screw 49 is operated by knob 52 to move the carriage 4 and the scanner 2 one inch to the right. The screw 46 is then operated to move stop 45 one inch to the left. This adjustment maintains the right-hand scanning position at the same position as for all other lines and the end of the path of travel of the scanner to the right will be the same, but the travel of the scanner to the left will terminate one inch to the right of where it terminates for other or optimum length lines.

If it is desired to skip lines on the copy to avoid photographing a line in the copy containing error as a result of which the line was rewritten, or merely to rearrange lines, it is only necessary to move the copy holder 26 on its carriage 27 to bring the desired line into registration with the apertured mask 13 of the scanner 2 each time a rewritten line is to be scanned. Of course, the scanner 2 must also be moved downwardly one line at a time for proper coverage of the film in the camera.

The apparatus of the invention may also be used to form a patterned right-hand margin, for example, when the copy is advertising copy and includes a picture around which the copy is written. In such a case, the picture can be masked off and the copy justified by properly adjusting the right-hand margin for each line or group of lines. After the copy has been scanned, the entire picture may be photographed in normal fashion.

Referring now to FIG. 2, another more refined embodiment of the present invention is seen to comprise a base 110 which may be secured to the copy board of a conventional camera or which may be a separate component otherwise suitably positioned with respect to the camera so that the optical field of the camera encompasses a portion of the base. The base 110 supports the four major components of the apparatus, a scanner carriage assembly 112, a copy carriage assembly 114, a scanner unit 116 and a justifying coupling assembly 118. In the illustrated embodiment the base 110 is provided with a column 120 which supports, by means of an arm 117, the camera 119 which has an optical system 121 suitably positioned over a copy sheet (FIG. 4).

Referring now to FIGS. 2–4, the scanner carriage assembly 112 is seen to comprise a scanner carriage 122 in the form of a substantially flat rectangular plate which is supported by suitable bearings 124 for reciprocatory movement on a pair of shafts 126 mounted adjacent the front of the base 110 by a plurality of upstanding brackets 128. A rack 130 is secured to the underside of the scanner carriage 122 between the shafts 126, and is driven by a gear 132 journaled for rotation in a bracket 134. The gear 132 is suitably driven by an electrical motor 133 located adjacent the rear of the base 110 through any convenient shaft 135 and/or other mechanical or electrical drive connecting means. The operation of the motor or of the motor and the drive connecting means, which may preferably include a disconnect element such as an electromagnetic clutch, is such that the gear 132 drives the rack 130 and the scanner carriage 122 from right to left as viewed in FIGS. 2 and 3, after which the scanner carriage 122 is returned to its initial position by means of a coil spring assembly 136 mounted on the base 110 by a bracket 138 and having a portion of the spring attached to the scanner carriage 122 by means of a clamp 140.

In addition to various adjustment and connecting mechanisms mounted on the scanner carriage which will be fully explained hereinafter in order to facilitate a more logical sequence in the description of the various components of the apparatus, the scanner carriage 122 is provided on its upper surface with a support bushing 142 in which a shaft 144 is journaled for rotation by means of suitable collars 146. The shaft 144 is urged toward the position illustrated in the drawings by means of a spring 148 which engages a pin 150 on the shaft 144 and at its other end bears on the surface of the scanner carriage 122. The shaft 144 may be rotated in a direction against the force of the spring 148 by means of a handle 152 for a purpose hereinafter fully explained.

As best seen in FIGS. 2 and 4, the shaft 144 is provided with an upwardly facing rack 154 which extends from the scanner carriage assembly 112 substantially the entire length of the shaft 144 to the opposite or rear end of the base 110. The shaft 144 supports the scanner unit 116 by means of a suitable support bushing 156 which, in turn, supports a gear 158 which meshes with the teeth of the rack 154 and is driven by means of the rod 160 and the knob 162 in order to reciprocate the scanner unit 116 back and forth along the shaft 144.

It will be apparent from the above description that as the scanner carriage 122 moves from right to left, as viewed in FIG. 2, the shaft 144 and the scanner unit 116 will be similarly transported from right to left across the copy carriage assembly 114 to a predetermined position by operation of the motor 135 and the gear 132 acting through the rack 130, after which the shaft 144 and scanner unit 116 are returned to a predetermined right-hand position by operation of the coil spring mechanism 136 acting upon the scanner carriage 122 when the motor and drive connecting means are disengaged as explained in more detail hereinafter. The scanner unit 116 is also moved with respect to the copy carriage assembly 114 in a direction normal to the lines of copy by rotation of the knob 162, the rod 160 and the gear 158 whereby the scanner unit 116 may be caused to traverse the entire area of the copy carriage assembly 114.

To facilitate the insertion and removal of copy from the copy carriage assembly 114, the entire scanner unit 116 is lifted angularly away from the copy carriage assembly 114 by rotating the shaft 144 by rotation of the handle 152.

Figure 8:
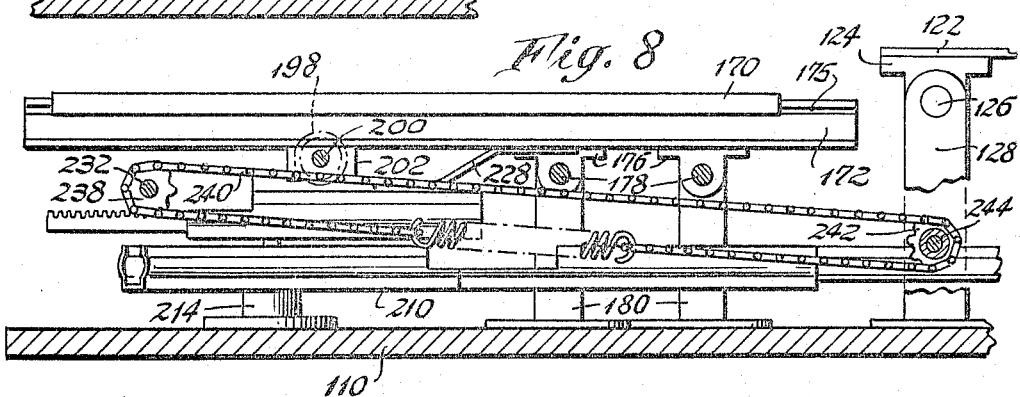
FIGURE 8 is an enlarged side sectional view taken on the line 8—8 of FIGURE 2.

Referring now to FIGS. 2, 4 and 5, the copy carriage assembly 114 is seen to comprise a removable copy holder 164 upon which is placed a sheet of copy 166 which is to be duplicated and the lines of which are to be justified. The copy sheet 166 is secured to the copy holder 164 by any suitable spring clips such as indicated by the numeral 168 in FIG. 4. The copy holder 164 rests upon a copy board 170 which, in turn, is vertically slidably mounted on a copy board base 172 by means of an in-turned flange 174 formed integrally along the opposite longitudinal sides of the copy board 170 and is adapted to ride in suitable grooves 175 (FIG. 8) formed in the upstanding sides of the copy board base 172. The copy board base is supported for lateral reciprocatory movement by means of a plurality of bearings 176 secured to the underside of the copy board base and which slide on a pair of shafts 178 supported on the base 110 by a plurality of upstanding brackets 180.

Means are provided within the copy carriage assembly 114 for skewing the copy holder 164 and copy 166 in order to properly line up the lines of print or other indicia 182 and 183 so as to lie in a path parallel to the lateral path of travel of the scanner unit 116 across the copy carriage assembly 114.

As best seen in FIG. 5, the copy holder 164 is positioned on the copy board 170 by means of a pin 184 fixed to the copy board 170 and by another pin 186 mounted on a block 188 which, in turn, is mounted on a threaded shaft 190, the shaft 190 being supported for rotation in a bearing 192 (FIG. 4) secured to the underside of the copy board 170 and terminating in a knob 194.

Referring to FIG. 2, it will be seen that the rotation of knob 194 in one direction effects downward movement of the block 188 and the pin 186 which serves to pivot the copy holder 164 in a counterclockwise direction about the fixed pin 184; opposite rotation of the knob 194 acting through the threaded rod 190, the block 188 and the pin 186, effects clockwise rotation of the copy holder 164 about the fixed pin 184. Thus accurate control of the alignment of the lines of print 182 and 183 is effected by manipulation of the knob 194. The manner of observing the necessity for making an adjustment of the alignment of the lines of print with the path of travel of the scanner unit 116 will be described in more detail hereinbelow.

As best seen in FIGS. 4 and 5, the copy board 170 is reciprocated in a direction normal to the lines of the copy 166 and relative to the copy board base 172 by means of a drive mechanism which comprises a rack 196 secured to the underside of the copy board 170 and a gear 198 mounted on a rod 200 which is journaled for rotation in a bearing 202 secured to the underside of the copy board base 172. The rod 200 terminates in a knob 204 by means of which the gear 198 is rotated to move the rack 196 and the copy board 170 relative to the copy board base 172. By this arrangement, one or more lines of print 182 or 183 may be entirely eliminated or displaced or transposed on the photographic reproduction without disturbing the consecutive order or reproduced lines of print; the copy board is simply moved one way or another by manipulation of the knob 204 to bring any desired line of print into alignment with the scanning aperture (more fully described hereinafter) of the scanning unit 116 without altering the normal consecutive vertical continuity of the lines of print reproduced by the camera.

Figure 6:
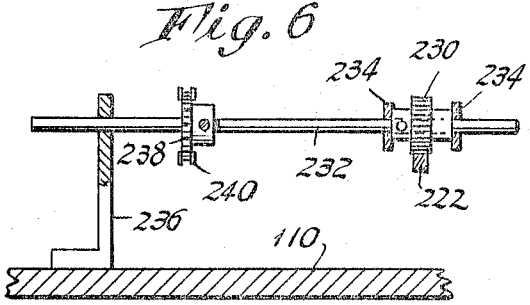
FIGURE 6 is an enlarged fragmentary sectional view taken on the line 6—6 of FIGURE 2.
Figure 7:
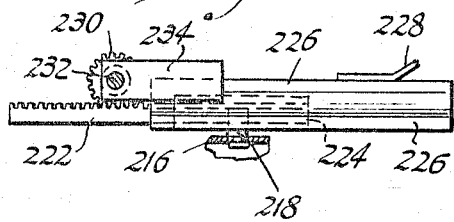
FIGURE 7 is an enlarged fragmentary side elevation of a portion of the coupling assembly illustrated in FIGURE 4.

Referring now to FIGS. 2, 4 and 5, the justifying coupling assembly 118 is seen to comprise a compensating bar, generally designated by the reference numeral 206, which has a front inner telescoping section 208 slidably received in the front end of an outer section 210, the opposite end of which is secured to a pivot pin 212 which is fixed in a bracket 214 secured to the base 110. A rear inner telescoping section 216 is slidably received in the end of the outer section 210 disposed over the pivot pin 212, and a compensating pin 218 is fixedly secured to the rear inner telescoping section 216. The pin 218 is loosely received in a bore 220 provided in a rack 222 which is formed integrally with the inner telescoping section 224 of a fixed slide 226 secured to the underside of the copy board base 172 by means of a suitable bracket 228. A gear 230 is mounted on a shaft 232 (FIG. 6) which is journaled for rotation in a pair of plates 234 which are secured to opposite sides of the fixed slide 226 (see FIG. 7). The gear 230 and the plates 234 are non-rotatably but slidably mounted on the shaft 232 so as to move back and forth across the shaft 232 as the copy board base 172, together with the fixed slide 226, moves laterally on the shafts 178 when the pins 212 and 218 are displaced from the position of axial alignment illustrated in FIG. 4. To effect such displacement, the shaft 232 is journaled for rotation in a suitable bracket 236 mounted on the base 110 and has affixed thereto adjacent the bracket 236 a sprocket 238 which is driven by a chain 240 (FIGS. 6 and 8) which in turn is driven by another sprocket 242 fixedly mounted on a rod 244 journaled for rotation in the nearer of the upstanding brackets 128, the rod 244 terminating in a suitable knob 246 (FIG. 2). Thus rotation of the knob 246 and the shaft 244 rotates the sprocket 242 which drives the chain 240, the sprocket 238, the shaft 232, the gear 230 and the rack 222 to displace the compensating pin 218 to the left or to the right of the pivot pin 212 as viewed in FIG. 4. It will also be apparent that displacement of the rack 222 and the pin 218 within the fixed bar 226 moves the rear inner telescoping section 216 of the compensating bar 206 by a similar amount and in a corresponding direction. The effect of the displacement of the pin 218 out of axial alignment with the pin 212 will be discussed in more detail hereinafter in connection with a description of the operation of the apparatus while compensating lines of print.

Referring now to FIGS. 4 and 12, it will be seen that the front inner telescoping section 208 of the compensating bar 206 is connected by means of a pin 250 received in a lost motion connecting slot 252 formed between a pair of depending extensions 254 of a block 256 positioned adjacent the underside of the scanner carriage 122 and slidably secured to the scanner carriage by means more fully described hereinafter.

As best seen in FIG. 2, it will be apparent that movement of the scanner carriage 122 from right to left causes a corresponding movement of the pin 250, thereby causing clockwise rotation of the compensating bar 206 about the pivot pin 212, and reverse movement of the scanner carriage causes a counterclockwise rotation of the compensating bar about the pivot pin 212.

The purpose of the slot 252, as seen in FIGS. 12 and 13, is to permit the scanner unit 116 to be moved toward the right beyond the lines of copy 182 and 183 by a distance equal to the length of the slot 252, this distance being termed the slack or overtravel and is indicated diagrammatically in FIG. 13 by the reference numeral 258. By comparing FIGS. 12 and 13, it will be seen that the pin 250 remains stationary as the scanner carriage assembly 112 moves from the position illustrated in FIG. 12 wherein the pin 250 is at the left end of the slot 252, to the position of FIG. 13 wherein the pin 250 is at the right end of the slot. Thus the pin 250 and the slot 252 constitute a lost motion connection between the scanner carriage assembly and the compensating bar. This movement of the scanner carriage assembly moves the scanner unit 116 from its position beyond the end of the lines of copy 182 and 183 to a predetermined position commensurate with the right end of an optimum length line of print or, in other words, the desired right margin to be maintained on the copy reproduction.

The relative movement between the scanner carriage assembly and the pin 250 is facilitated by a sliding plate 260 slidably mounted in a pair of grooves 261 (FIG. 13) formed in the bottom extensions 254 of the block 256 and is urged into engagement with the pin 250 by means of a spring 262 captured between one end of the plate 260 and a pin 264 mounted in the block 256. As the scanner carriage assembly moves from the position of FIG. 12 to the position of FIG. 13, the spring 262 expands and the plate 260 slides in the grooves 261, thereby holding the plate 260 and the pin 256 stationary relative to the base 110. The pin 250 does not commence movement until the block 256 contacts the pin 250 at which time the overtravel 258 has been taken up and the scanner unit 116 is in position to commence scanning a line of print at the desired position determined by an optimum length line of print to be reproduced. The function of the overtravel 258 in relation to positioning the scanner unit 116 at the right end of a line of print of optimum length will be more clearly understood in connection with the description of the operation of the device presented hereinafter.

It should be understood at this point that the movement of the compensating bar 206 is the measure of line justification; that is, the movement of the pin 250, which is attached to the compensating bar and to the scanner carriage assembly 112, determines the length of print line to be reproduced on the photosensitive element of the camera. It is, therefore necessary that the pin 250 move laterally the same distance with each succeeding line of print 182 or 183 that is being scanned. To achieve this result, right and left margin stops for the compensating bar and the pin 250 are provided and, in addition, one of these stops is adjustable to provide for left margin indentation on the reproduction if desired.

Referring to FIG. 2, the left margin stop is seen to comprise a limit switch 266 suitably mounted on one of the brackets 128 in position to have its actuator 268 contacted by a front wall portion 253 of the block 256 when the scanner carriage assembly 112 has completed a scanning stroke. As explained more fully hereinafter, the limit switch 266 de-activates the driving mechanism for the scanner carriage assembly to permit the assembly to return to its starting position under the influence of the coil spring 136. It should be noted that the pin 250 is held in engagement with the block 256 during the entire movement of the scanner carriage assembly by the spring 262 and the sliding plate 260.

The right margin stop for the pin 250 is seen in FIGS. 2, 3, 4 and 12 and comprises a horizontally disposed L- shaped member 270 which lies under the scanner carriage 122 and extends into the path of travel of the pin 250. The stop member 270 is integrally connected to a vertical arm 272 which is secured to a threaded block 274 mounted on a threaded shaft 276 which is journaled for rotation in the pair of brackets 128 adjacent the front of the base 110. The shaft 276 terminates in a suitable operating crank 278. The upstanding arm 272 terminates upwardly in a recess 280 which receives the frontmost shaft 126 which acts as a guide to prevent rotation of the arm 272 and stop member 270 relative to the base 110 and thereby guides the members 270 and 272 for reciprocatory movement in response to rotation of the shaft 276 by the crank 278. It will be apparent that movement of the stop 270 in either direction by rotation of the shaft 276 will determine the right end of the lines of print reproduced on the photosensitive element or, in other words, the position of the stop 270 determines the right margin of the entire reproduced copy.

The specific details of the scanning unit 116 will be more fully described hereinbelow, but for normal justifying operation it need only be presently observed that the scanning unit is provided with a housing 280 containing a high intensity lamp and having a mask 282 which covers the entire area illuminated by the lamp except for an aperture 284 which permits a small portion of a single line to be illuminated. The aperture 284 is approximately a line space in height and approximately equal to a letter space in width. Thus, as the scanner unit 116 traverses a line of print 182, an image is reproduced letter-by-letter on the camera photosensitive element.

With reference now to FIGS. 9, 10 and 11, the operation of the apparatus will be described with regard to line justifying only, the semi-automatic feature and various adjusting features being deferred for the sake of clarity. If it is assumed that the copy 166 to be reproduced has been properly placed on the apparatus and an appropriate adjustment has been made to the stop 270 by the shaft 276 to determine the proper right-hand margin to be maintained on the reproduction, and the scanner unit 116 has been adjusted by the knob 162 and the gear 158 to position the aperture 284 over the topmost line of print, the apparatus is now ready to justify the succeeding lines. If, as illustrated in FIG. 9, the first line of print to be justified is equal in length to the optimum length of line desired on the reproduction, then no justification of this line is necessary. In this event, the knob 246 is rotated to drive the chain 240, the gear 238, the shaft 232, the gear 230, the rack 222, and the compensating pin 218 in a direction to position the pin 218 directly over the pivot pin 212. In this position, as the scanner carriage 122 moves fom its full line position, as seen in FIG. 9, to the dotted line position, after taking up the overtravel provided by the slot 252, the compensating bar 206 correspondingly moves from its full line position to its dotted line position rotating clockwise about the pivot pin 212. Simultaneously the scanner unit 116 moves from its full line position to its dotted line position and scans the entire line. Since the compensating pin 218, which is connected to the copy board base 172 through the fixed slide 226 and bracket 228 (FIG. 4), is in axial alignment with the pivot pin 212, the compensating pin does not move laterally during movement of the compensating bar but remains over the pivot pin and, therefore, does not effect any lateral movement of the copy board base 172. Therefore, in scanning this optimum length line of print, the image of the line reproduced on the photosensitive element of the camera is neither expanded nor condensed but rather is reproduced as an exact image.

By appropriate means, fully described hereinafter, the scanner carriage 122 and scanner unit 116 are returned to their starting positions and the knob 162 is rotated to bring the aperture 284 of the scanner unit into alignment with the second line of print. The parts are now as illustrated in FIG. 10.

As seen in FIG. 10, the second line of print is longer than the optimum length of print and, therefore, must be condensed in the photographic image in order to maintain a justified right margin. In order to condense the line of print on the photographic image, it is necessary to obtain simultaneous relative movement between the scanner unit 116 and the copy carriage assembly 114, whereby the copy carriage assembly moves to the right by an amount determined by the excess length of the actual line of print over the desired optimum length, while the scanner unit 116 is moving to the left to scan the line. This is accomplished by rotating the knob 246 to drive the chain 240, the gear 238, the shaft 232, the gear 230 and the rack 222 to move the compensating pin 218 upwardly relative to the copy 166, this movement of the compensating pin 218 moving the entire copy carriage assembly 114 to the left as viewed in FIG. 10 because of the angular relationship between the compensating bar 206 and the path of travel of the compensating pin 218 along the longitudinal axis of the rack 222. This movement of the pin 218 is continued until the right end of the longer line of print appears in the aperture 284 of the mask 282, disregarding for the moment the overtravel feature provided by the slot 252. It will now be apparent from FIG. 10 that as the scanner carriage 122 moves from its full line position to its dotted line position, carrying the compensating bar with it, the pin 218, being disposed on the opposite side of the pivot pin 212 from the driving pin 250, moves the copy carriage assembly 114 to the right from its full line position to its dotted line position. Since the scanner carriage 122 and compensating bar 206 move the same distance during each stroke as determined by the stops 270 and 266, the scanner unit 116 similarly moves the same distance with each stroke. However, since in the FIG. 10 situation, the copy carriage assembly 114 moves in a direction opposite to the direction of movement of the scanner unit 116 by an amount equal to the excess of the actual line of print over the desired optimum length as indicated by the numeral 300, the image of this line of print is condensed on the photosensitive element by an equal amount thereby making the image of this line equal in length to the image of the preceding line which is the optimum length of line desired on the reproduction. It should be remembered that during this operation the camera and its photosensitve element remains stationary.

Coming now to FIG. 11 wherein the parts are illustrated preparatory to scanning the third line of print which is seen to be shorter than the optimum length line and, therefore, must be expanded on the photographic image by an amount equal to the difference between the shorter actual length and the optimum length desired, the knob 246 is again rotated to move the compensating pin 218 to a position forward of the pivot pin 212 which correspondingly shifts the copy carriage assembly 114 to the right to a new full line position by an amount indicated as 302 in which the right end of the shorter line is in view of the aperture 284 of the mask 282, again disregarding the overtravel feature. It will now be apparent that as the scanner carriage 122 is moved between the stops 270 and 266 from the full line position to the dotted line position, carrying the compensating bar 206 from its full line position to its dotted line position by means of the pin 250, the compensating pin 218 effects a leftward movement of the copy carriage assembly 114 from the full line position to the dotted line position which is a direction similar to that of the direction of movement of the scanner unit 116, and by an amount equal to the difference between the actual length line and the optimum length line as indicated at 302. Since the copy is now moving in the same direction as the scanner unit 116, the image of the shorter line is expanded on the reproduction by an amount necessary to bring the length of the reproduced image of this line of print into registry with the length of the previous lines and justified with the desired right margin of the reproduction.

As the scanner unit 116 is shifted by knob 162 to each successive line of print it is, therefore, necessary to readjust the position of the compensating pin 218 relative to the pivot pin 212 so that the compensating bar 206 causes a movement of the copy carriage assembly 114 in a direction and an amount determined by the excess 300 or deficiency 302 of the length of an actual line of print in comparison to the optimum length line of print desired on the reproduction. Thus each and every line of print is expanded or contracted, if necessary, so that the reproduction has equal right and left margins throughout the sheet of copy.

Returning now to the overtravel permitted by the lost motion connection slot 252, it was stated for the sake of simplicity that the knob 246 is adjusted to shift the copy carriage assembly 114 to the left or to the right until the last character or letter of the line appears in the aperture 284. This, in fact, is not the case since the function of the overtravel permitted by the slot 252 in the block 256 is to allow the aperture 284 to move beyond the last character of a given line of print. The reason for this is the fact that it is frequently difficult to accurately align the scanner unit 116 with a line of print by sighting through the aperture 284. Therefore, to achieve accurate alignment, a transparent sighting guide 304 such as the clear plastic sheet illustrated in FIG. 16 is attached to the mask 282 and is provided with horizontal and vertical guide lines 306 which lie immediately over the line of print, the horizontal guide lines marking the top and bottom of all non-ascending and non-descending letters. As indicated in FIG. 16, it is, of course, necessary for the aperture 284 to encompass ascending and descending letters. Therefore, a more accurate adjustment of the aperture position may be accomplished by using the guide lines 306 and the plastic sheet 304 when moving the scanner unit 116 by means of the knob 162. The overtravel 258 shown in FIG. 16, which is drawn to an enlarged scale relative to FIG. 13, is equal to the length of the slot 252 so that when the block 256 contacts the pin 250 to commence movement of the compensating bar 206, the aperture 284 will be in the desired position to commence scanning a line of print at the right margin desired on the reproduction. Therefore, it is now apparent that FIGS. 9, 10 and 11 illustrate the true positions of the aperture 284 and the guide lines 306 of the plastic sheet 304 before the overtravel has been taken up when adjusting the copy carriage assembly 114 for justifying lines of print of different lengths.

It is frequently necessary to limit the movement of the scanner carriage assembly 112 and the scanner unit 116 to something less than a full stroke normally permitted by the stops 270 and 266. This situation arises where, for example, a succession of lines such as indicated at 183 in FIG. 2, or an entire paragraph is indented from the normal left margin or where lines or paragraphs are staggered such as copy in outline form. Adjustment of the leftward movement of the scanner carriage assembly and the scanner unit is accomplished by means of a control mounted on the scanner carriage 122 and comprises, as seen in FIGS. 3, 12, and 14, a threaded shaft 310 journaled for rotation in a pair of supports 312 secured to the underside of the scanner carriage 122, the shaft being threadedly received in the block 256. The shaft is operated by a suitable knob 314. It will be apparent that rotation of the knob 314 causes movement of the scanner carriage 122 relative to the block 256 from its normal position shown in FIG. 12 to the position shown in FIG. 14 where the scanner carriage 122 is situated with its left side adjacent the block 256. In this position the end of a scan will still occur when the forward wall 253 strikes the limit switch stop 266; but now that the scanner carriage 122 and, therefore the scanning unit 116, are offset to the right relative to the compensating bar 206 and the pivot pin 212, the mask and aperture carried by the scanner unit and the scanner carriage assembly will stop short of the former left limits of the copy in a position corresponding to the left limits of the indented lines 183. In this situation, however, it becomes necessary to reset the aperture 284, or the guide lines 306 when considering the overtravel, at the position determined by the desired right margin to be maintained on the reproduction. This is accomplished without disturbing the new positions of the block 256 and pin 250 relative to the scanner carriage 122 by rotating the crank 278 and shaft 276 to move the right margin stop member 270 toward the left which in turn moves the pin 250 and the entire scanner carriage assembly and scanner unit toward the left until the aperture 284 or the guide lines 306 are in registry with the desired right margin in the reproduction or with the right end of an optimum length line of the indented lines 183. This latter adjustment is necessary in order to effect proper justification of the indented lines, and has the effect of shortening the stroke of the scanner carriage assembly and scanner unit by an amount equal to the amount of indentation of the lines of copy 183 compared to the left margin of the lines 182.

It should be observed that in all of the aforementioned situations represented by FIGS. 9, 10 and 11, the scan distance of the scanner unit and, therefore, the film exposed, are identical, but the width of the copy presented through the aperture varies. The same is also true even when scanning the left margin indented lines, even though the overall scan distance is less than that for unindented lines by the amount of the indentation.

It should also be noted that in the illustrations presented in FIGS. 9, 10 and 11, the rear inner telescoping section 216 and that portion of the outer section 210 which surrounds the rear inner portion 216, come to rest at the end of a scan in a perpendicular position such that the compensating pin 218 and the pivot pin 212 are aligned in a direction normal to the lines of copy, even though they are not in axial alignment. Thus, the pivot pin 212 and the copy carriage assembly 114 assume the same position at the end of the scan regardless of the position of the compensating pin 218 with respect to the pivot pin 212. This assures that the left margin of the lines of copy receives no correction, the correction commencing at the right margin of the copy and terminating at the left margin, whether the scan is for a wide, normal or short line.

Even when scanning the indented lines 183 as described above, the rear telescoping portion 216 of the compensating bar 206 still assumes a vertical position relative to the lines of copy print and subsequent scanning movements of indented lines still terminate with the compensating bar 206 in the same position. In other words, it is seen that regardless of the length of line of copy being scanned, the compensating bar 206 always ends the scan in a precise position, the scan being ended when the front wall 253 of the block 256 strikes the actuator 268 of the limit switch stop 266.

Referring now to FIG. 17, a wiring diagram is shown which serves to illustrate the manner in which the apparatus is operated in a semi-automatic manner. A pair of leads 320 and 322 are connected with a suitable source of power. A main switch 324, when closed, energizes a circuit including the normally closed limit switch 266, a line 326, a movable switch plate 327 of a relay 330, a contact 328, a line 332, a light bulb 334 and the line 320. The light bulb 334 is suitably positioned within the scanner unit housing 280 to illuminate the plastic sheet 304 containing the guide lines 306 to facilitate accurate alignment of the scanner unit 116. Also included in the circuit energized by the main switch 324, is a line 336 and a solenoid 338. The solenoid 338, when energized, maintains a shutter 339 (FIG. 18) suitably attached to the camera 119 closed to prevent any inadvertent exposure of the film by shifting the shutter 339 to a position beneath the lens system 121 against the force of a return spring 339' which maintains the shutter open when the solenoid 338 is not energized. A start button 342 is inserted in the line 322 to momentarily close a circuit to the relay 330 which comprises the line 322, the normally closed limit switch 266, the start button 342, the relay 330, a line 344 and the line 320. Actuation of the start button 342 also establishes a circuit through the line 322 to two parallel lines 348 and 350, the line 348 including the scanning motor winding 352 and the line 350 including a high intensity projection lamp 354 located in the scanner unit housing 280. At the same instant actuation of the start button 342 energizes the relay 330 which moves the switch plate 327 from the contact 328 to the contact 329 thereby establishing a holding circuit through the line 326 and a line 356 to maintain the scanner motor 352 and the projection lamp 354 energized while simultaneously breaking the circuits comprising line 332 with the lamp 334 and line 336 with the solenoid 338 whereby the lamp 334 goes out and the camera shutter 339 controlled by the solenoid 338 is opened.

A description of the overall operation of the apparatus may now be readily understood. Assuming it is desired to reproduce in justified manner a sheet of copy 166 having unindented lines 182 and indented lines 183 as illustrated in FIG. 2, the copy 166 is placed on the copy holder 164 and secured in position by the spring clips 168. The scanner unit 116 is then raised by rotating the shaft 144 by means of the handle 152, and the copy holder 164 is fitted over the pins 184 and 186. The scanner unit is then lowered into its operating position and the main switch 324 is closed to energize the observation light 334 and the solenoid 338 which closes the shutter 339. The knob 246 is rotated to adjust the compensating pin 218 to a neutral position wherein the compensating pin is in axial alignment with the pivot pin 212 so that no movement of the copy carriage assembly 114 takes place during subsequent setting-up movements of the scanner carriage assembly 112. This is done by aligning arrow 172a on the copy board base 172 with an index 110a on the base 110.

The scanner carriage assembly and the scanner unit are then manually moved across the copy to ascertain whether or not the copy is in proper horizontal alignment with the path of travel of the aperture 284 and the guide lines 306 on the transparent sighting guide 304. If the copy is not properly aligned, the knob 194 is rotated to move the pin 186 by means of the block 188 and thereby shift the copy holder 164 clockwise or counterclockwise about the fixed pin 184 as needed to properly align the lines of print with the path of travel of the guide lines 306 and the aperture 284. After achieving proper alignment, the scanner carriage assembly and the scanner unit are manually moved to the extreme left-hand position where the left margin of the unindented lines of print 182 should be just out of sight in the mask aperture 284. If not, adjustment of the knob 314 to move the scanner carriage 122 and the scanner unit 116 a little bit further to the left is necessary so that on a normal scanning operation the aperture 284 moves just beyond the left margin of the lines of print. This adjustment is made so that the front wall 253 of the block 256 strikes the actuator 268 of the limit switch stop 266 when the aperture 284 has traversed the line of print to just beyond the extreme left letter.

The scanner carriage assembly and the scanning unit are then returned to the right-hand position after which the optimum right margin on the copy, which corresponds with the desired justified margin on the reproduction, is established at the guide lines 306 of the transparent guide 304 by rotating the crank 278 and the shaft 276 to shift the right margin stop member 270 to the left or to the right as needed until the guide lines are at the desired position. It will be recalled from FIG. 12 that movement of the right margin stop 270 also effects movement of the scanner carriage assembly 112 and the scanner unit 116 through the pin 250 and the block 256.

The knob 162 is now adjusted to bring the aperture 284 of the scanner unit 116 over the uppermost line of print 182 on the copy, if this has not previously been done. If the length of the uppermost line is equal to the optimum length of line desired on the reproduction, no further adjustment is necessary and the apparatus is ready to commence operation. If, on the other hand, this line is longer or shorter than the optimum length line, an appropriate adjustment of the compensating pin 218 is required by means of the knob 246 as described above, this adjustment having the effect of displacing the compensating pin relative to the pivot pin 212 to effect condensing or expansion of the line of print as necessary, as fully explained above in connection with the description of FIGS. 10 and 11.

Having accomplished any necessary adjustment of the compensating pin 218, the start button 342 is momentarily depressed; this energizes the relay 330 which shifts the switch blade 327 from the contact 328 to the contact 329, thereby breaking the circuits through lines 332 and 336 which include the observation lamp 334 and the shutter solenoid 338 respectively, which opens the shutter 339 and simultaneously energizing the circuits through lines 348 and 350 which include the motor winding 352 and the high intensity lamp 354 respectively, these latter circuits being maintained through the holding circuit 326–327–329–356. It should be noted at this time that the winding 352 represents not only the motor winding but either any addition thereto or as a substitution thereof, the winding of any suitable electromagnetic clutch or other electrically operated drive element which serves to connect and disconnect the motor 133 with the gear 132 whether or not the motor is permitted to continue in operation during a return stroke of the scanner unit 116.

As the gear 132 rotates, it acts through the rack 130 to shift the scanner carriage assembly 112 and the scanner unit 116 toward the left until the front wall 253 of the block 256 strikes the actuator 268 of the limit switch stop 266. This serves to open the normally closed contacts of the limit switch, momentarily breaking the entire circuit, whereupon the high intensity lamp 354 goes out, the relay 330 is de-energized permitting the switch blade 327 to return to the contact 328, the electrical drive connections represented by the winding 352 are de-energized, and the scanner carriage assembly 112 and the scanner unit 116 are returned to their right-hand position by operation of the coil spring 130. As soon as the front wall 253 moves out of contact with the limit switch actuator 268, the circuits for the observation light 334 and the shutter solenoid 338 are re-established through the lines 326, 336 and 332 respectively, thereby turning on the observation lamp and closing the shutter 339.

When the scanner carriage assembly 112 and the scanner unit 116 are returned to their starting position, knob 162 is rotated to bring the aperture 284 and the guide lines 306 into registry with the next line of print whereupon another adjustment of the compensating pin 218 is made, if necessary, and the preceding cycle of operation is repeated.

The above procedure is followed until all of the unindented lines of print 182 have been scanned and reproduced. When the first indented line 183 is reached, the scanner carriage assembly and the scanner unit are manually moved to the extreme left-hand position after which the knob 314 is rotated to shift the scanner carriage 122 and the scanner unit 116 back toward the right until the aperture 284 is just beyond the left margin of the indented lines. During this operation it is necessary to maintain contact between the front wall 253 of the block 256 and the limit switch stop 266. After adjusting the knob 314, the scanner carriage assembly and scanner unit are returned to the right-hand position, after which the crank 278 is operated to shift the right margin stop 270 toward the left to a position which re-establishes alignment between the aperture 284, or the guide lines 306 if considering the overtravel, and the desired right margin to be maintained on the reproduction. After making these two adjustments, the apparatus justifies succeeding lines in accordance with the varying lengths of the indented lines and operated to scan in the manner described above.

If it should be desired to either eliminate certain lines of print from the reproduction or to transpose lines into a different order from that appearing on the copy, this may be accomplished by adjusting the knob 204 to shift the copy board 170 relative to the copy board base 172 in a vertical direction relative to the lines of print. Assuming, therefore, that the first line of print 182 has been scanned and reproduced and it is desired to skip the second line, the knob 162 is rotated to bring the aperture 284 into registry with the second line of print, after which the knob 204 is rotated to shift the copy board 170 upwardly which carries the copy holder 164 and the copy 166 to a position where the third line of print is now in registry with the aperture 284. When this third line of print is scanned and reproduced, it will appear as the second line on the reproduction. The second line may be omitted entirely without further adjustment of knob 204 or it may be reinserted further down on the reproduction by again operating the knob 204 to bring the second line of print into registry with the aperture 284 when the scanner unit 116 is at any desired line along the sheet of copy. By this procedure it is apparent that lines or whole paragraphs may be eliminated or shifted, for example, where it is desired to insert a photograph or other matter between two lines which appear consecutively on the original copy.

Referring now to FIGS. 19 and 20, which illustrate the structural details of an adjustable mechanism for controlling the size of the aperture through which the printed matter is exposed to the camera lens, it is seen that the support bushing 156, which supports the scanner unit 116 for movement along the shaft 144, is provided with a vertical wall 360 connected at its lower edge with the stationary mask 282. The scanner unit housing 280 is also connected to the wall 360 and to the mask 282, and has suitable means therewithin for supporting the high intensity lamp 354 and any necessary light directing means such as lenses, reflecting surfaces, etc., which may be necessary to project a high intensity beam of light through the aperture 284 of the mask 282 to illuminate a spot on the copy sheet supported beneath the mask. The housing 280 is provided with suitable duct means 364 and a fan (not shown) as is customary with high intensity light projectors.

The mask aperture 284 must be of sufficient height to accommodate the largest size print which it is anticipated the apparatus will be called upon to reproduce, considering particularly capital letters as well as ascending and descending lower case letters. It is obvious, therefore, that if copy matter of a smaller size than this anticipated maximum is being reproduced, means must be provided to close down the aperture so that not more than a line space in height of the copy matter actually being photographed is exposed to the light-sensitive element of the camera.

It is also apparent from FIG. 19 that a problem exists with respect to maintaining coincidence between the rays of reflected light from the copy sheet to the camera lens and the particular line of printed matter being copied as the scanner unit moves from line to line down the page of copy sheet. The reason for this is that, due to the thicknesses of material inherent in the fixed lower mask 282 and the means for adjusting the size of the aperture to be fully described hereinbelow, the reflected rays of light will properly register a line space image on the camera light-sensitive element only when the aperture of the scanner unit is in vertical alignment with the axis of the lens. As the scanner unit moves up or down the page to a position out of a vertical alignment with the lens axis, the reflected rays of light will gradually move below or above, respectively, the line of printed matter being reproduced. To overcome this difficulty means are provided for gradually shifting the aperture up or down relative to a given line of printed matter so that the reflected rays of light observed by the camera lens always remain coincident with the upper and lower limits of the line being photographed. The structure hereinafter described provides both of the foregoing features in a single unit.

A slidable upper mask 365 is mounted on the lower mask 282 between suitable guide means and has an aperture 366 which registers, at least in part, with the aperture 284 of the lower mask 282. The upper mask 365 has an upstanding rear wall 367 with a threaded bushing 368 secured thereto which threadedly receives a rod 369 which extends inwardly toward the apertures 284 and 366 and is connected to an adjustable shutter 370 slidably received on the upper mask 365. It is apparent that as the rod 369 is rotated the shutter 370 moves relative to the upper mask 365 to shorten or lengthen the height of the aperture 366 in accordance with the height of the line of printed matter being reproduced. This adjustment is made so that the largest character, such as a capital letter or an ascending or descending letter, is fully visible to the camera lens through the aperture.

It will also be seen from FIG. 19 that the directed rays of light from the lamp 354 pass through the apertures 366 and 284 at an angle to the horizontal plane of the copy sheet, and that the reflected rays of light from the copy sheet to the camera lens pass through the apertures at a constantly varying angle relative to the plane of the copy sheet as the scanner unit 116 moves up and down the copy sheet. To compensate for the gradual shift of the reflected rays of light between the moving scanner unit and the fixed camera lens, the upper mask is provided with a pin 371 which is engaged in a slot 372 formed in one end of a pivot plate 373 pivotally mounted on the mask 282 by a pin 374. A spring 375 connected to the mask 282 and to a lateral extension 376 of the plate 373, constantly urges the plate 373 in a clockwise direction about the pin 374 as viewed in FIG. 20 to urge the upper mask 365 and shutter 370 upwardly relative to the lines of copy. Also mounted on the pin 374 is an L-shaped link 377 having an upwardly extending arm 378 which supports a follower 379 in a position vertically offset from the pivot 374. The link 377 is adjustably secured to the pivot plate 373 through a threaded rod 379' which is journaled for rotation in a bushing 380 mounted on the link 377 and is threadedly received in another bushing 381 mounted on the pivot plate 373. A cam 382 (see FIG. 2) is integrally attached to the shaft 144 and extends substantially the full length thereof and is gradually tapered from a wide rear end to a narrow front end.

It will be apparent that the spring 375 is effective through the plate 373, the rod 379' and the link 377–378, to maintain the follower 379 in contact with the cam 382 as the scanner unit 116 moves along the shaft 144 while scanning successive lines. The cam 382 permits a gradual clockwise rotation of the follower, the link and the pivot plate about the pivot 374 which causes a corresponding gradual movement of the upper mask 365 and the shutter 370 through the pin 371. If it is assumed that the ultimate size aperture defined by the upper mask 365 and the shutter 370 is positioned such that the upper and lower limits of a line space are coincident with the reflected rays of light observed by the lens, this ultimate aperture is gradually shifted relative to the copy sheet as the scanner moves from line to line. If the ultimate aperture is not properly adjusted for a line space when the aperture is vertically aligned with the axis of the lens, an appropriate adjustment may be made by rotating the rod 379′ in one direction or the other to shift the pivot plate 373 relative to the link 377.

A vertical extension 383 of the housing 280 encloses a suitable observation lamp which lights up the general area of the masks and the transparent guide 304; this is a low intensity lamp and is used only when making necessary adjustments either to the scanner aperture mechanisms just described, or when making necessary adjustments in order to properly justify a line of print. To further facilitate these adjustments, a suitable mirror 384 is pivotally connected to the housing 280 by means of arms 385 which lie outside of a pair of vertical walls 386 which serve to confine the rays of light from the high intensity lamp 354. The mirror is raised from its full line position, illustrated in FIG. 19, to the dotted line position so that an operator may view the line of print through the aperture and make necessary adjustments thereto while in a sitting position.

Figure 21:
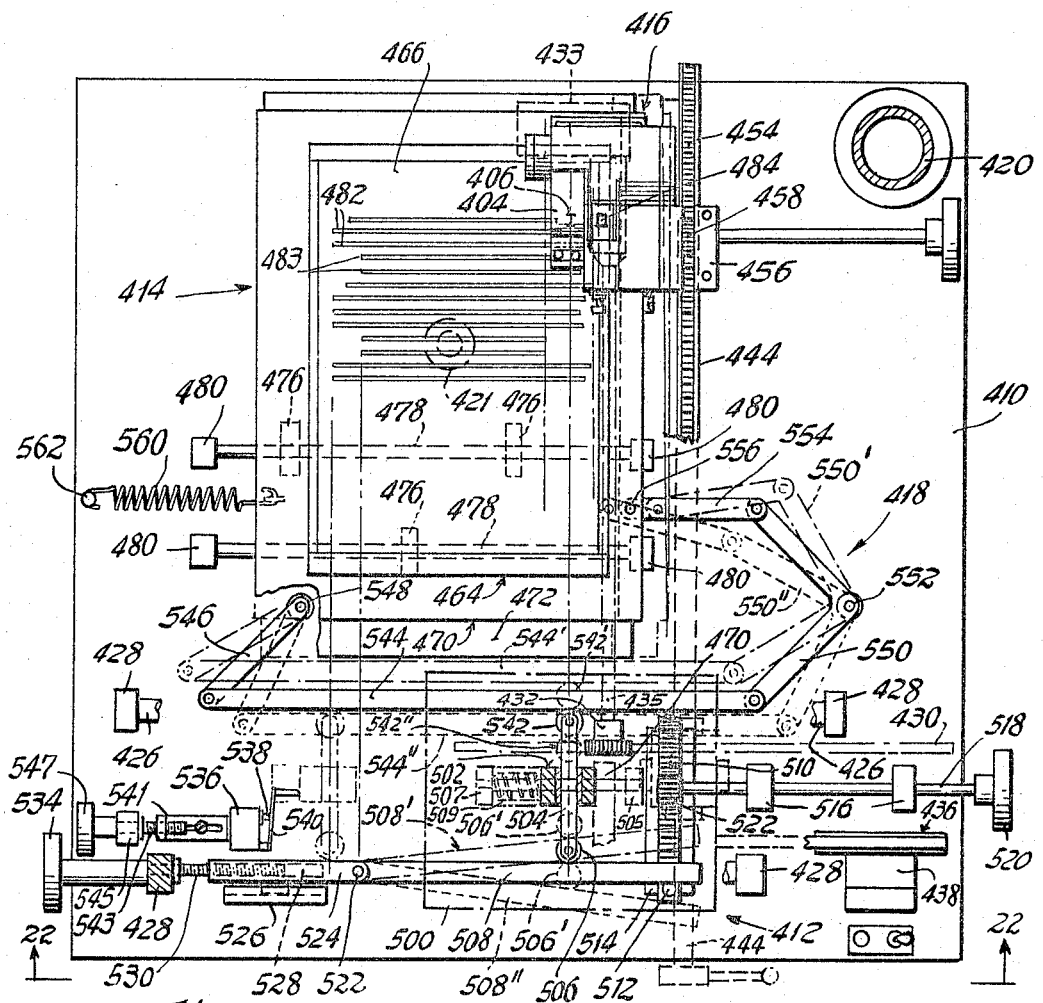
FIGURE 21 is a view similar to FIGURE 2 of still another modification of the apparatus of this invention.
Figure 22:
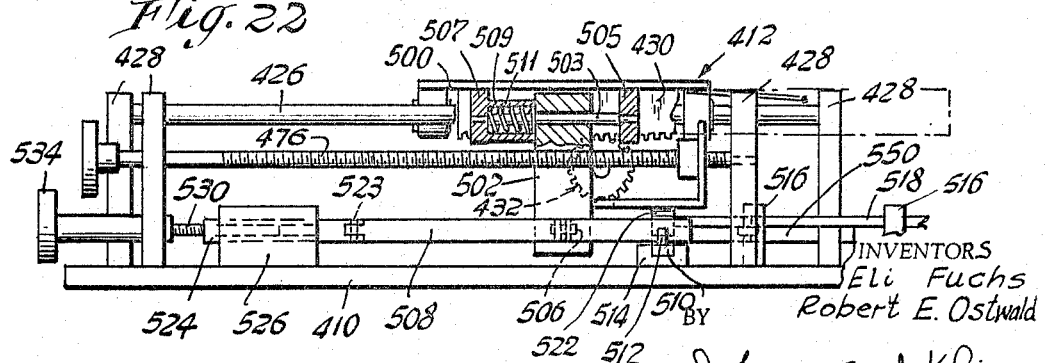
FIGURE 22 is a front elevation taken on the line 22—22 of FIGURE 21.

Referring now to FIGS. 21 and 22, there is illustrated still another embodiment of the present invention in which a copy carriage assembly is variably coupled to a scanner carriage through an alternate coupling assembly which not only provides a much more simply operated arrangement for effecting margin settings and justification for indented lines, but also assures accurate positioning of the parts with less stringent manufacturing tolerances. The apparatus comprises, with corresponding components seen in FIG. 2 identified by corresponding reference numerals in the 400 series, a base 410 and a column 420 for supporting and positioning a camera having an optical system 421 in position over a sheet of copy 466 substantially in the manner illustrated in FIG. 2. The apparatus also includes a copy carriage assembly 414 and a scanner unit 416 mounted on a support bushing 456 which in turn is mounted on a shaft 444 for movement laterally of the copy sheet 466, the same being movable normal to the lines of copy on the copy sheet by means of the gear 458 engaging with the rack 454. The copy carriage assembly 414 is mounted for reciprocatory movement on the shafts 478 supported by the brackets 480 by means of the bearings 476. A modified coupling assembly 418 variably couples the copy carriage assembly 414 with a modified scanner carriage assembly 412.

The scanner carriage assembly 412 comprises a scanner carriage 500 which is configurated similarly to that illustrated in FIG. 2 and which supports the shaft 444 for movement therewith in the manner illustrated in FIG. 2. The scanner carriage 500 is mounted for reciprocatory movement on the shafts 426 supported by the brackets 428 on the base 410, and is driven from right to left by a gear 432 acting upon a rack 430 secured to the scanner carriage 500, the gear 432 being driven by a motor 433 through the shaft 435, all in a manner similar to that illustrated in FIG. 2. The scanner carriage is returned from left to right by a spring motor 436 secured to a bracket 438, the spring being secured to the scanner carriage in a manner similar to that illustrated in FIG. 3.

The electrical circuitry and driving operation of this embodiment of the apparatus are the same as that illustrated in FIG. 17, and the accompanying portions of the specification. The scanner carriage 500 supports on its undersurface a block 502 having a reciprocating follower 504 slidably received in the block 502. The front end of the follower 504 has a roller 506 mounted thereon which is adapted to travel along a bar 508 as the scanner carriage 500 moves from one extreme position to another. The bar 508 is slidably received in one end of a rack 510 between the end tooth thereof and a pin 512. The rack is received in a suitable slide bar 514 secured to the base 410. Also secured to the base is a pair of supports 516 which rotatably receive a rod 518 which terminates outwardly in an operating knob 520 and inwardly in a gear 522 which meshes with the teeth of the rack 510. It will be apparent that rotation of the knob 520 causes reciprocatory movement of the rack 510 with a corresponding oscillating movement of the bar 508 from the solid line position shown to any intermediate position such as those indicated as 508′ and 508″ about a pivot point 522.

The pivot point 522, is carried by a bar 524 slidably but non-rotatably received in a guide 526 secured to the base 410, the bar 524 having a threaded bore 528 which receives the threaded end of a rod 530 journaled for rotation in the bracket 428 mounted on the base 410, the rod 530 being operated by a suitable knob 534. It will be apparent that rotation of the knob 534 operates through rod 530 and the threaded bore 528 to shift the bar 524 laterally, causing a corresponding movement of the bar 508 for a purpose to be more fully explained hereinafter.

A limit switch 536 having an actuator 538 and a contact blade 540 is adjustably mounted on the base 410 by the bracket 541 which is movable by means of the screw shaft 543 which is rotatably mounted in a fixed bearing 545 and actuated by the knob 547. The switch 536 functions to terminate a scanning stroke of the apparatus and also serves as a left margin stop in a manner similar to the switch 266 illustrated in FIG. 2.

The rear end of the follower 504 has another roller 542 mounted thereon which is adapted to ride along a link 544 pivotally connected at its left end to an arm 546 which in turn is pivotally connected to the base 410 as at 548. The opposite end of the link 544 is pivotally connected to one end of a bell crank 550 which is pivotally mounted on the base 410 as at 552, the other end of the bell crank being pivotally connected to a link 554 which in turn is connected to the copy carriage assembly 414 as at 556. It will be seen that the arm 546, the link 544 and the bell crank 550 form a four-bar linkage pivoted to the base 410 at one end and to the copy carriage assembly at the other end in such a manner that the link 544 is always parallel to the direction of scanning. It should be noted that the pivot 556 is actually secured to the copy board base 472 so that the copy board 470 is still free to slide vertically with respect to the copy board base 472 to facilitate omission or transposition of lines of print as fully explained above. The copy carriage assembly 414 is constantly urged toward the left by means of a spring 560 connected to the copy board base 472 and secured at its other end to a suitable pin 562 mounted on the base 410.

It will now be apparent from a consideration of the foregoing that as the spring 550 urges the copy carriage assembly 414 toward the left, this tends to rotate the bell crank 550 counterclockwise about its pivot 552 which in turn urges the link 544 into engagement with the roller 542 of the follower 504 which in turn urges the roller 506 into engagement with the bar 508 regardless of its angular position relative to the link 544. By tracing the foregoing motion path in the opposite direction, it can be seen that movement of the rack 510 to shift the bar 508 to one of the positions 508′ or 508″ acts through the slidable follower 504 to shift the link 544 to corresponding positions indicated as 544′ and 544″ which in turn rotates the bell crank 550 either clockwise to the position 550′ or counterclockwise to the position 550″ thereby effecting lateral movement of the copy carriage assembly 414 to alternate right or left positions.

It should be noted that the block 502 is attached to the scanner carriage 500 by means of a lost motion connection in such a manner that the scanner carriage assembly 412 and the scanner unit 416 can be moved toward the right beyond the optimum right hand margin by a distance sufficient to bring the guide lines 406 of the transparent guide 404 into registry with the last letter of the optimum length line after the block 502 strikes the right margin stop 470, and permits the aperture 484 to be moved into registry with the optimum right margin without any movement of the coupling assembly 418. This is accomplished by mounting the block 502 on a shaft 503 fixedly supported from the underside of the scanner carriage 500 by a pair of blocks 505 and 507. The block 507 is provided with an integral sleeve 509 and a compression spring 511 received therein which engages the block 507 at one end and at the other end urges the block 502 toward the right relative to the scanner carriage 500. Since the block 502 is free to slide on the shaft 503 between the limits of the supporting block 505 and the spring sleeve 509, it will be apparent that as the scanner carriage 500 is moved toward the left the block 502 and the follower 504 remain stationary until the left face of the supporting block 505 strikes the right face of the block 502 as viewed in FIG. 22. At this point, the aperture 484 will have been moved from the position illustrated in FIG. 22 to the optimum right hand margin and will then lie directly over the center line of the rollers 506 and 542. Continued movement toward the left of the scanner carriage 500 commences to effect movement of the coupling assembly 518 and the copy board 470, as described hereinafter.

In justifying uneven lines of print such as the full length lines 482, the copy sheet 466 is placed on a copy holder 464 and appropriately secured, after which the scanner unit 416 is raised and the copy holder is fitted in place on the copy board 470 and adjusted for horizontal alignment of the lines of print with the scanning path as fully described above with regard to FIG. 2. After lowering the scanner unit and turning on the observation light and closing the shutter as described above, the knob 520 is rotated to shift the bar 508 to its neutral position indicated in full lines in which it is parallel with the path of movement of the scanner carriage 500 and the scanner unit 416; in this position it is apparent that the scanner carriage can be moved back and forth across the copy sheet without any lateral shifting of the copy support assembly 414, since the bar 508 and the link 544 are parallel.

The scanner carriage is moved to the right-hand position after which the right margin stop 470 mounted on the threaded shaft 476 and which corresponds structurally and functionally to the right margin stop 270 as illustrated in FIG. 2, is adjusted to the left or to the right as needed until the guide lines 406 of the transparent guide 404 are at a position corresponding to the optimum right margin on the copy which is the desired justified margin on the reproduction. If the length of a line to be scanned is equal to the optimum length line desired on the reproduction, no further adjustment of the apparatus is necessary and operation thereof is commenced and carried out in the manner fully described above.

If, on the other hand, and as indicated in FIG. 21, the first line to be scanned is shorter than the optimum length line desired on the reproduction, the knob 520 is rotated to shift the rack 510 rearwardly which in turn shifts the bar 508 to the position 508'; this correspondingly shifts the link 544 to the position 544' and the bell crank 550 to the position 550', thereby shifting the copy carriage assembly 414 to the right until the last character of the line of print is properly aligned with the guide lines 406. As the scanner carriage 500 moves from right to left, the roller 506, now in the position 506', rides down the bar 508' permitting the follower 504 to slide through the block 502 which in turn permits the link 544', now resting on the roller 542', to move downwardly which permits clockwise rotation of the bell crank 550' and a corresponding leftward movement of the copy carriage assembly 414, all under the urging of the spring 560. Thus it is seen that with all of the parts initially commencing movement in their prime positions, the copy carriage assembly 414 moves in the same direction as the scanner unit 416, thereby resulting in an expansion of the short line of print on the copy sheet to an optimum length line of print on the reproduction.

If a line of print is longer than the optimum line desired on the reproduction, the knob 520 is rotated to shift the rack 510 frontwardly to shift the bar 508 to the position indicated as 508" which, under the urging of the spring 560, moves the aforementioned parts to their double prime position. As the scanner carriage now moves from right to left, the roller 506" rides up the bar 508" shifting the follower 504 rearwardly which shifts the roller 542" and the link 544" rearwardly to rotate the bell crank 550" clockwise about the pivot 552 to shift the copy carriage assembly 414 in a direction opposite to the direction of movement of the scanner carriage 500 and the scanner unit 416. Thus a line of print which is longer on the copy than the desired optimum length line is condensed to the optimum length line on the reproduction as fully explained above in connection with the previous embodiment of the apparatus.

A salient feature of this embodiment of the apparatus is that something less than the entire line is expanded or condensed where justification of a non-optimum length line is required. It will be observed that the pivot point 522 is disposed away from the limit switch stop 536 and that after roller 506 passes over the pivot point 522 the link 544 is not shifted by further movement of the scanner carriage 500 since the bar 524 is parallel to the link 544. It is thus apparent that all justification of any given line takes place over the length of the line covered by the bar 508, the amount of the line remaining unjustified, or appearing as an exact image on the reproduction, being determined by the distance between the pivot point 522 and the point at which the follower 504 stops when the block 502 actuates the limit switch stop 536. It is only necessary that the pivot point 522 be disposed to the right of the left margin so that the justifying correction is completed at some point within the line.

In this embodiment of the invention, in order to justify indented lines such as indicated at 483, it is only necessary to rotate the knob 534 to shift the bar 524 toward the right until the pivot point 522 is located within the indented line at the point where it is desired to terminate the line correction. Since this also shifts the pivot 522 and the bar 508 to the right by a corresponding amount, the proportionate amounts of the indented lines being justified and remaining unchanged respectively may or may not remain the same as for the unindented lines 482 as desired.

It is possible, with this embodiment of the apparatus, to justify a succession of indented lines without making the above adjustment, if it is not desired to leave a portion of the indented line unjustified. This may be accomplished by setting the pivot point 522 directly in line with the left margin of the indented lines 483 so that the portion of the full lines 482 which remains unchanged is equal to the amount of indentation of the indented lines 483.

The photographic master produced as described above may be employed in subsequent processes and with other known apparatus to provide prints of the original copy.

The simplicity, efficiency, and wide utility of the invention will be clear to those skilled in the art from the foregoing description of the invention. It will also be clear that the basic principles of the invention are useful with other types of scanning means and other types of utilization apparatus than the optical and photographic apparatus specifically shown. For example, if the original copy were prepared with magnetic ink, an electrical scanning and utilization apparatus could be employed. In addition, combinations of optical and electrical apparatus could be employed.

It will be apparent from the above description and accompanying drawings that there is provided a method and apparatus which overcomes the aforementioned disadvantages of the prior art apparatus and which achieves the foregoing objects and advantages of the invention. It is to be understood that this invention is not limited to the specific embodiments described and shown herein, which are intended to illustrate the best modes presently contemplated for carrying out the principles of the invention and which are susceptible to modification of form, size, location and arrangement of parts, but is intended to encompass all such modifications and equivalents thereof as may be deemed to be within the spirit and scope of the invention as defined in the appended claims.

What we claim and desire to secure by Letters Patent is:

1. Apparatus for producing uniformly expanded or contracted justified images of lines of copy from an original having a plurality of lines of various lengths forming a nonuniform right-hand margin, said apparatus comprising means to support an original copy, means mounting the copy support for traveling movement parallel to lines of copy on the original copy, scanning means including illuminating means for illuminating successive increments of the line of copy, and means mounting said scanning and illuminating means over said copy support for traveling movement relative to said original copy and parallel with a line of the latter a determinable distance equal to the length of a justified line, variably settable differential coupling means connected to said scanning means and said copy support in continuous and synchronous driving relationship capable of differentially and continuously moving said copy support a limited distance in direct response to movement of said scanning means over said determinable distance, and control means operatively connected to said coupling means for determining the amount of said limited distance movement of said copy support to be equal to the difference in length, if any, between a line of copy being scanned and the length of a justified line, and for simultaneously setting said coupling means to cause said coupling means to uniformly move said copy support over said limited distance, if any, while said scanning means travels said determinable distance, said coupling means, when thus set by said control means in response to said determination, moving said copy support means continuously said determined limited distance which is equal to the amount, if any, by which the image of a line of copy being scanned will be produced in uniformly expanded or contracted form as a justified image on a light receiving medium as said scanning means travels the determinable distance equal to the length of a justified line.

2. Apparatus as set forth in claim 1 wherein said control means includes means operably connected to said coupling means for causing the latter to move said copy support selectively in either direction in response to a uni-directional travel of said scanning means over said determinable distance, whereby the produced images of said lines of copy may be uniformly expanded or contracted depending upon whether a selected line of copy is shorter or longer respectively than a selected determinable length of a justified line.

3. Apparatus as set forth in claim 1 wherein said control means comprises a settably movable element operable when moved to move said coupling means and copy support connected thereto independently of movement of said scanning means to position the last character of a line to be scanned in registration with said scanning means when the latter is positioned at the right-hand end of said determinable distance, and means to move said element, whereby the distance by which the location on said original copy of a desired justified right-hand margin is moved away from said scanning means when the latter is so positioned is the measure of said limited distance movement of said copy support as said scanning means travels said determinable distance.

4. Apparatus as set forth in claim 3 wherein said settably movable element has a neutral non-driving position and opposed contra-directional driving positions associated with said coupling means, said element being movable from said first named position in opposite directions to any of said second named positions and being automatically set in an appropriate one of any of said positions in response to said last character registration movement of said copy support to thereby set said coupling means to move said copy support in a direction and an amount controlled by the setting of said element in one of said positions.

5. Apparatus as set forth in claim 4 wherein said neutral non-driving position and said opposed contra-directional driving positions are defined respectively by a position of particular physical orientation of said element with another portion of the apparatus and positions out of said orientation, said position of particular orientation being visible to an operator of the apparatus, whereby said coupling means may be set to said neutral non-driving position by operation of said means to move said element in accordance with the particular orientation of said element with said other portion of the apparatus.

6. Apparatus as set forth in claim 4 wherein said coupling means comprises an arm pivotably connected to said scanning means, said arm having an elongate slot formed therein, a fixed pin connected to said copy support and received in said slot, and a movable pin carried by and forming a part of said control means, said second pin also being received in said slot and being movable with respect to said fixed pin to a position in which both said pins are axially aligned in said slot or in opposite directions therefrom to positions which said pins are out of axial alignment, said position of axial alignment being said neutral non-driving position of said control means and said non-axial positions being said opposed contra-directional driving positions of said control means in any of which said arm pivots about said movable pin to continuously move said copy support means in response to movement of said scanning means, the direction and amount of disalignment of said pins determining the direction and amount of said limited distance movement of said copy support.

7. Apparatus as set forth in claim 4 wherein said coupling means comprises a bar pivotally connected to said scanning means, a fixed pin supporting said bar for pivotal movement about the axis of said pin, and a movable pin carried by said bar for movement along the longitudinal axis of said bar, said movable pin interconnecting said bar and said copy support and forming a part of said control means, said movable pin being movable relative to said fixed pin and along said bar to a position in which both said pins are axially aligned or in opposite directions therefrom to positions where said pins are out of axial alignment, said position of axial alignment being said neutral non-driving position of said control means and said non-axial positions being said opposed contra-directional driving positions of said control means in any of which said bar pivots about said fixed pin to continuously move said copy support in response to movement of said scanning means, the direction and amount of disalignment of said pins determining the direction and amount of said limited distance movement of said copy support.

8. Apparatus as set forth in claim 4 wherein said coupling means comprises a follower movably carried by said scanning means, means operated by the follower and connected to said copy support for moving said copy support in response to movement of said follower, and an elongated bar disposed generally along the path of movement of said scanning means and along which said follower rides as said scanning means traverses said determinable distance, said bar forming a part of said control means and having means pivotably mounting said bar for angular adjustment relative to said path of movement of said scanning means to a position in which said bar is parallel to said path of movement or in opposite angular directions therefrom to positions where said bar is not parallel to said path of movement, said parallel position being said neutral non-driving position of said control means and said non-parallel positions being said opposed contra-directional driving positions of said control means in any one of which said follower is moved by said bar to continuously move said copy support in response to movement of said scanning means, the direction and amount of non-parallelism of said bar determining the direction and amount of said limited distance movement of said copy support.

9. Apparatus as set forth in claim 8 wherein said means for pivotally mounting said bar defines a pivot axis which is disposed adjacent to but spaced to the right of the left-hand terminus of said determinable distance of travel of said scanning means, said mounting means including another bar connected to said pivotable bar which is fixedly disposed in parallel relation to said path of movement of said scanning means and over which said follower rides as said scanning means moves from the location of said pivot axis to said left-hand terminus of said determinable distance, whereby the image of a line of copy is expanded or contracted to the justified length over a major portion of the line and a minor portion thereof is projected in the exact image thereof.

10. Apparatus as set forth in claim 9 wherein said means for pivotally mounting said bar includes means for adjustably moving said pivot axis in a direction along said path of movement of said scanning means, whereby the major portion of the image of a line which is expanded or contracted may be varied.

11. Apparatus as set forth in claim 1 further including adjustable stop means operable on said scanning means for varying the position of the right-hand terminus of said determinable distance of travel of said scanning means to vary the determinable length of the justified images of said lines of copy.

12. Apparatus as set forth in claim 1 further including settably adjustable means through which said coupling means is connected to said scanning means, said adjustable means being operable to move said scanning means independently of said coupling means to thereby vary said determinable distance of travel of said scanning means without affecting the limited distance movement of said copy support, whereby the images of lines of copy having an indented left-hand margin on the original may be justified to the same desired right-hand margin as non-indented lines of copy.

13. Apparatus as set forth in claim 1 wherein said scanning means further includes means for moving said scanning means in a direction perpendicular to said lines of copy for successively registering said scanning means with said lines of copy, and further including means for moving said copy support in a direction perpendicular to said lines of copy independently of said scanning means, whereby the successive order of the justified images of said lines of copy may be changed from that in which said lines of copy appear on said original copy.

14. Apparatus as set forth in claim 1 further including drive means for moving said scanning means over said determinable distance from right to left relative to said lines of copy, and means responsive to completion of said movement for returning said scanning means to the right-hand terminus of said determinable distance.

15. Apparatus as set forth in claim 14 wherein said drive means includes means positioned at the left-hand terminus of said determinable distance for disengaging said drive means from said scanning means when actuated by the latter, said means for returning said scanning means to said right-hand terminus comprising resilient means normally urging said scanning means toward said right-hand terminus but yieldable to said drive means when the latter is engaged with said scanning means.

16. Apparatus as set forth in claim 1 wherein said copy support comprises a copy board and a flat copy sheet holder pivotally supported on said copy board, and means for pivotally moving said copy sheet holder on said copy board, whereby said copy sheet holder may be adjusted to dispose said lines of copy parallel to the path of movement of said scanning means.

17. Apparatus as set forth in claim 1 wherein said coupling means includes separately adjustable means for optionally causing said limited distance movement of said copy support to occur only during a variably major portion of the traveling movement of said scanning means over said determinable distance and for maintaining said copy support stationary during the remainder of the traveling movement of said scanning means.

18. Apparatus as set forth in claim 1 wherein said coupling means is connected to said scanning means by lost motion connection means, whereby said scanning means may be moved beyond the right-hand terminus of said said determinable distance without causing corresponding movement of said coupling means or said copy support.

References Cited by the Examiner
UNITED STATES PATENTS

| | | | |
|---|---|---|---|
| 2,207,266 | 7/1940 | Ogden | 95—4.5 |
| 2,261,538 | 11/1941 | Brand | 95—4.5 |
| 2,685,830 | 8/1954 | Robins | 95—4.5 |

JOHN M. HORAN, *Primary Examiner.*